United States Patent
Walker et al.

(10) Patent No.: US 11,470,374 B2
(45) Date of Patent: Oct. 11, 2022

(54) METHOD FOR BROADCAST SERVICE SIGNALING

(71) Applicant: QUALCOMM Incorporated, San Diego, CA (US)

(72) Inventors: Gordon Kent Walker, Poway, CA (US); Giridhar Dhati Mandyam, San Diego, CA (US); Charles Nung Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/452,500

(22) Filed: Oct. 27, 2021

(65) Prior Publication Data
US 2022/0046307 A1 Feb. 10, 2022

Related U.S. Application Data

(63) Continuation of application No. 16/386,709, filed on Apr. 17, 2019, now Pat. No. 11,190,827.
(Continued)

(51) Int. Cl.
*H04N 21/278* (2011.01)
*H04N 21/234* (2011.01)
(Continued)

(52) U.S. Cl.
CPC ....... *H04N 21/278* (2013.01); *G06F 16/2255* (2019.01); *H04L 1/0061* (2013.01);
(Continued)

(58) Field of Classification Search
CPC .............. H04N 21/278; H04N 21/234; H04N 21/4345; H04N 21/2362; G06F 16/2255;
(Continued)

(56) References Cited

U.S. PATENT DOCUMENTS

| 11,190,827 B2 | 11/2021 | Walker et al. |
|---|---|---|
| 2012/0180102 A1 | 7/2012 | Fan |

(Continued)

FOREIGN PATENT DOCUMENTS

EP    1758295 A2    2/2007

OTHER PUBLICATIONS

DVB Organization: "A360-2018-Security.pdf", DVB, Digital Video Broadcasting, C/0 EBU-17A Ancienne Route—CH-1218 Grand Saconnex, Geneva—Switzerland, Jan. 10, 2018, XP017854801, 33 pages.

(Continued)

*Primary Examiner* — Alazar Tilahun
(74) *Attorney, Agent, or Firm* — The Marbury Law Group, PLLC

(57) ABSTRACT

Systems, methods, and devices enable a receiver device to determine completeness of low level signaling (LLS) tables received via broadcast transmissions. In various embodiments, broadcast service signaling may include determining whether a received LLS table is a directory table identifying each of a complete set of LLS tables, parsing the directory table, determining whether the directory table is confirmed based at least in part on a digital signature in the directory table, determining whether a complete set of LLS tables is received based at least in part on the identification of each of the complete set of LLS tables in the directory table, and determining available services based at least in part on the complete set of LLS tables before an expiration a repetition time period after receiving the directory table.

22 Claims, 22 Drawing Sheets

Related U.S. Application Data

(60) Provisional application No. 62/664,902, filed on Apr. 30, 2018.

(51) Int. Cl.
    *H04L 9/32*     (2006.01)
    *H04L 1/00*     (2006.01)
    *H04L 29/08*     (2006.01)
    *G06F 16/22*     (2019.01)
    *H04L 69/324*     (2022.01)

(52) U.S. Cl.
    CPC .......... *H04L 9/3247* (2013.01); *H04L 69/324* (2013.01); *H04N 21/234* (2013.01)

(58) Field of Classification Search
    CPC ... H04L 1/0061; H04L 9/3247; H04L 69/324; H04L 1/0041; H04L 67/56; H04L 9/3239; H04L 9/3268; H04L 67/04
    See application file for complete search history.

(56) References Cited

U.S. PATENT DOCUMENTS

| | | | |
|---|---|---|---|
| 2015/0244711 A1 | 8/2015 | Venkataraman et al. | |
| 2016/0234355 A1* | 8/2016 | Lee | H04L 65/611 |
| 2017/0171576 A1* | 6/2017 | Oh | H04L 67/02 |
| 2018/0048932 A1* | 2/2018 | Eyer | H04N 21/64753 |
| 2019/0335221 A1 | 10/2019 | Walker et al. | |

OTHER PUBLICATIONS

DVB Organization:"TM-IPI3309 Signaling-Delivery-Synchronization-and-Error-Protection-A331-S33-174r7-2017-05-04.pdf", DVB, Digital Video Broadcasting, C/0 EBU-17A Ancienne Route—CH-1218 Grand Saconnex, Geneva—Switzerland, Sep. 5, 2017, XP017854522, table 6.1, 201 pages.

International Preliminary Report on Patentability—PCT/US2019/028085, The International Bureau of WIPO—Geneva, Switzerland, Nov. 12, 2020.

International Search Report and Written Opinion—PCT/US2019/028085—ISA/EPO—dated Jul. 2, 2019.

* cited by examiner

METHOD FOR BROADCAST SERVICE SIGNALING

RELATED APPLICATIONS

This application is a continuation of U.S. patent application Ser. No. 16/386,709 entitled "Method for Broadcast Service Signaling" filed Apr. 17, 2019, which claims the benefit of priority to U.S. Provisional Patent Application 62/664,902 entitled "Method for Validating LLS Table Receipt," filed Apr. 30, 2018, the entire contents of both of which are hereby incorporated by reference for all purposes.

BACKGROUND

In current broadcast systems, such as broadcast systems operating according to the Advanced Television Systems Committee (ATSC) standards (e.g., ATSC 2.0, ATSC 3.0, etc.), broadcast systems operating according to the Digital Video Broadcasting (DVB) standards, broadcast systems operating according to the $3^{rd}$ Generation Partnership Project (3GPP) standards, etc., signaling information needed by receiver devices to acquire broadcast services is carried in low level signaling (LLS) tables received via broadcast transmissions. In such current systems, before a receiver device can determine available services, the receiver device must wait a full repetition time period to ensure that all LLS tables have been received. This forced delay corresponding to the entire full repetition time period slows service acquisition and reduces the quality of the user experience with the services.

SUMMARY

Systems, methods, and devices of various embodiments enable a receiver device to determine completeness of low level signaling (LLS) tables received via broadcast transmissions to enable quicker initial display of content. In some aspects, broadcast service signaling may include determining whether the received LLS table is a directory table identifying each of a complete set of LLS tables, parsing the directory table in response to determining the LLS table is a directory table, determining whether the directory table is confirmed based at least in part on a digital signature in the directory table, determining whether a complete set of LLS tables is received based at least in part on the identification of each of the complete set of LLS tables in the directory table in response to determining that the directory table is confirmed, and determining available services based at least in part on the complete set of LLS tables before an expiration a repetition time period after receiving the directory table in response to determining that the complete set of LLS tables is received. In various aspects, determining whether the directory table is confirmed based at least in part on a digital signature in the directory table may include determining whether the digital signature matches a certificate associated with LLS tables, and determining that the directory table is confirmed in response to determining that the certificate associated with the LLS table matches the digital signature indicated in the directory table. In some aspects, the digital signature may be a cryptographic message syntax (CMS) signed data element. In some aspects, the directory table identifies each of the complete set of LLS tables by type and group. In some aspects, the complete set of LLS tables and the directory table correspond to a same physical layer pipe; or the complete set of LLS tables correspond to all LLS tables for a broadcast stream and the directory table is generated for the broadcast stream. In some aspects, the complete set of LLS tables are a table set for a random-access point (RAP). Some aspects may further include acquiring one or more selected service of the determined available services Further aspects include a computing device having a processor configured with processor-executable instructions to perform operations of any of the methods summarized above. Further aspects include a computing device including means for performing functions of any of the methods summarized above. Further aspects include a non-transitory processor-readable storage medium having stored thereon processor-executable instructions configured to cause a computing device processor to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
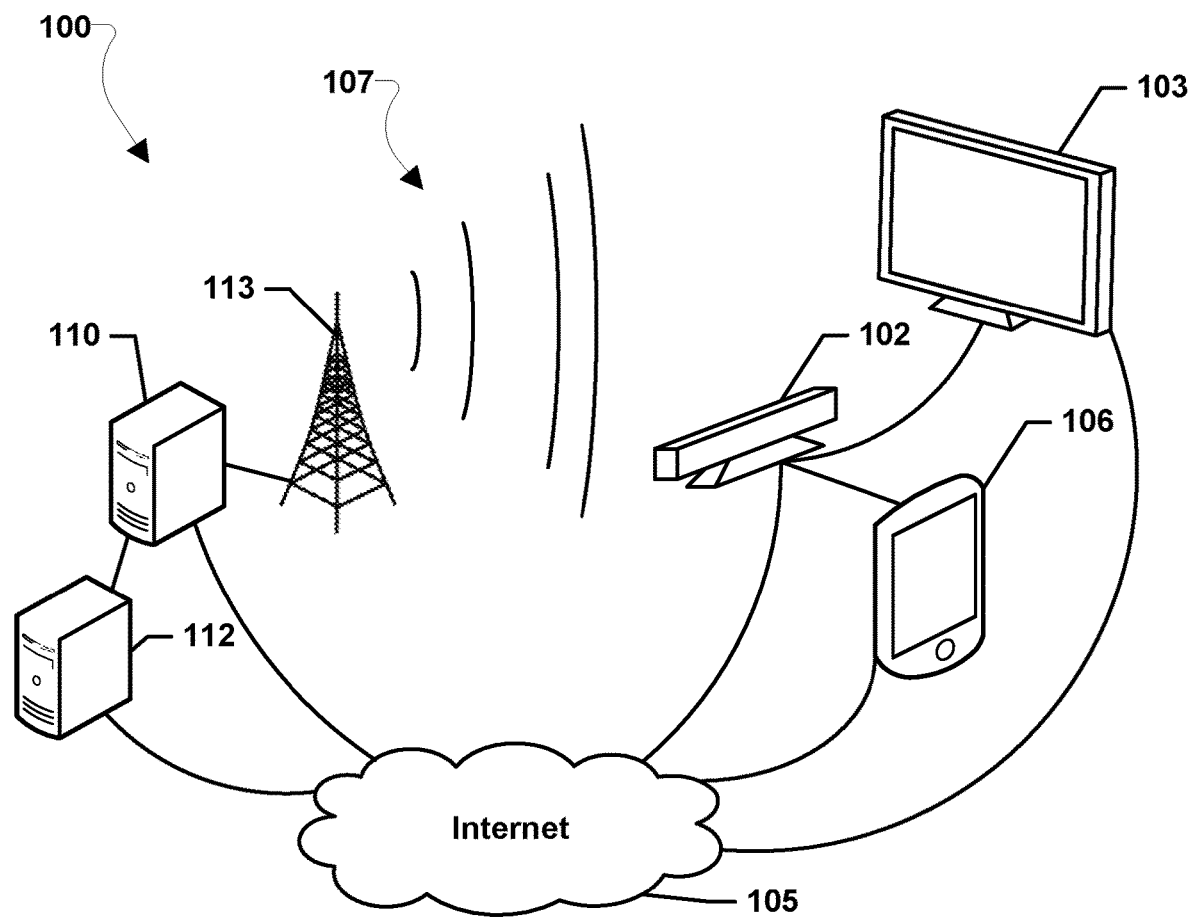
FIG. 1 is a communication system block diagram of a broadcast network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry for sending and/or receiving transmissions. As a specific example, a "mobile device", "receiver device", or "computing device" may be configured to receive Over-the-Air (OTA) broadcasts of content.

As used herein, the term "gateway" refers to any computing device that may include a programmable processor and memory and circuitry for receiving OTA broadcasts of content and providing the content to one or more computing devices over a local network. A gateway device may be any broadcast receiver that has a connection to a local network and that is discoverable on the local network by another computing device.

The term "server" is used to refer to any computing device configured with software instructions to function as a server, such as a master exchange server, web server, mail server, document server, content server, a time synchronization ("time synch") server, or any other type of server. A server may be a dedicated computing device or a computing device configured with a server software module (e.g., running an application which may cause the computing device to operate as a server). A server module (e.g., server application) may be a full function server module in a dedicated computing device, or a light or secondary server module (e.g., light or secondary server application) that is configured to provide synchronization services among the dynamic databases on receiver devices. A light server or secondary server may be a slimmed-down version of server type functionality that can be implemented on a receiver device or a gateway device to enable such device to support some of the functions of an Internet server (e.g., an enterprise e-mail server) to the extent necessary to provide the functionality described herein.

In current broadcast systems, such as broadcast systems operating according to the Advanced Television Systems Committee (ATSC) standards (e.g., ATSC 2.0, ATSC 3.0, etc.), broadcast systems operating according to the Digital Video Broadcasting (DVB) standards, broadcast systems operating according to the 3rd Generation Partnership Project (3GPP) standards, etc., signaling information needed by receiver devices to acquire broadcast services is carried in low level signaling (LLS) tables received via broadcast transmissions. LLS tables in current systems are categorized into five types: service list tables (SLTs), rating region tables (RRTs), system time fragments, advanced emergency alert tables (AEATs), and onscreen message notification fragments. In such current systems, before a receiver device can determine available services, the receiver device must wait a full repetition time period, such as 5 seconds, to ensure that all LLS tables have been received. The full repetition time period, such as 5 seconds, corresponds to the minimum repetition rate for transmissions of the LLS tables in such current systems and waiting the full repetition time period allows the receiver device to ensure all LLS tables have been received. In such current systems, there is no mechanism to signal completeness of a set of LLS tables and no mechanism for receiver devices to detect added tables or deleted tables. As such, receiver devices in such current systems may have to wait the entire full repetition time period, such as 5 seconds, after receiving a first LLS table possibly before acquiring a broadcast service, regardless of whether the necessary LLS tables may already have been received (e.g., previously received and stored in a memory, received in the first transmission, etc.). This forced delay corresponding to the entire full repetition time period, such as 5 seconds, slows service acquisition and reduces the quality of the user experience with the services.

Systems, methods, and devices of various embodiments enable a receiver device to determine completeness of low level signaling (LLS) tables received via broadcast transmissions to enable display of content to begin sooner than the full repetition time period for LLS table transmissions. Some embodiments may include adding additional tables to the LLS tables to be broadcast and/or modifying the LLS tables to be broadcast to include information enabling a receiver device to determine completeness of the LLS tables received at the receiver device. In such embodiments, the LLS tables to be broadcast may correspond to the same physical layer pipe (PLP). In embodiments in which the LLS tables are broadcast correspond to the same PLP, the receiver device may be configured to determine completeness of the LLS tables received on a per-PLP basis. In such embodiments, the LLS tables to be broadcast may correspond to all LLS tables for a broadcast stream. In embodiments in which the LLS tables are broadcast correspond to all LLS tables for a broadcast stream, the receiver device may be configured to determine completeness of the LLS tables received on a per-broadcast stream basis. Such embodiments may enable a receiver device to determine completeness of LLS tables received via broadcast transmissions without waiting the entire full repetition time period, such as 5 seconds.

In some embodiments, broadcast service signaling may include generating a directory table identifying one or more LLS tables to be broadcast and sending the directory table in a broadcast stream of the one or more LLS tables. For example, a directory table may be generated by a server, such as a broadcaster server, controlling the operations of a broadcast transmitter to generate OTA transmissions of broadcast content. In various embodiments, the directory table may identify the one or more LLS tables to be broadcast by type and group. In various embodiments, the directory table may be a directory for the LLS tables carried on a single PLP. In some embodiments, the directory table may be a directory of all LLS tables of a broadcast stream. In some embodiments, a receiver device may parse the directory table to determine whether all of the one or more LLS tables to be broadcast have been received. In some embodiments, the directory table may be broadcast after the one or more LLS tables are broadcast in each full repetition time period. In such embodiments, receiver devices may be configured to determine that a received table is the last table by determining that the table is a directory table.

In some embodiments, a cyclic redundancy check (CRC) code may be generated for a portion of the directory table and the one or more LLS tables to be broadcast. In some embodiments, the CRC code may be calculated using at least byte values corresponding to three fields of each of the directory table and the one or more LLS tables. As one example, an LLS table identifier field, an LLS group identifier field, and an LLS table version field of each table (e.g., the directory table and the one or more LLS tables) may be used to calculate the CRC code. In some embodiments, the CRC function used to generate the CRC code may be an 8, 16, 32, or 64 bit function or other signaled width. When only three fields of each directory table and the one or more LLS tables are used with the signaled width CRC function, the additional eight bits may be padded. Alternatively, a byte value of a further field, such as the byte value of the count field (e.g., a group_count_minus one field, an LLS table count field, etc.), may be used with the LLS table identifier field, the LLS group identifier field, and the LLS table version field to calculate the CRC code. In some embodiments, the CRC code may be indicated in the directory table before the directory table is broadcast. For example, the CRC code may be indicated in a field or attribute added to the directory table. In various embodiments, a portion of the directory table and the one or more LLS tables may be used to calculate the CRC. In various embodiments, the portion may be a first number of bytes, such as a first three bytes, a first four bytes, etc. In various embodiments, the portion may be all bytes of the directory table and one or more LLS tables. In some embodiments, the CRC type may be indicated in the directory table before the directory table is broadcast. The CRC type may indicate the CRC function used to calculate the CRC code. For example, the CRC type may be indicated in a field or attribute added to the directory table. As another example, the CRC type may be indicated in a table to be broadcast, such as a first one or the one or more LLS tables to be broadcast. In some embodiments, a CRC type table may be generated indicating the CRC type. In some embodiments, a CRC type table may be broadcast first (e.g., before the one or more LLS tables and the directory table) in each full repetition time period. In some embodiments, a receiver device may use the CRC code to confirm the directory table. In various embodiments, the presence of a CRC type table may indicate to a receiver device that the CRC type table is the first table of a set of LLS tables.

In some embodiments, a hash function may be applied to the directory table and the one or more LLS tables to be broadcast to generate a hash value. In some embodiments, the hash function may be applied to entire tables. In some embodiments, the hash function may only be applied to a portion of each table, such as the first four fields of the directory table and the first four fields of the one or more LLS tables. In some embodiments, the hash value may be indicated in the directory table before the directory table is broadcast. For example, the hash value may be indicated in a field or attribute added to the directory table. In some embodiments, a hash type may be indicated in the directory table before the directory table is broadcast. The hash type may indicate the applied hash function. For example, the hash type may be indicated in a field or attribute added to the directory table. As another example, the hash type may be indicated in a table to be broadcast, such as a first one or the one or more LLS tables to be broadcast. In some embodiments, a hash type table may be generated indicating the hash type. In some embodiments, a hash type table may be broadcast first (e.g., before the one or more LLS tables and the directory table) in each full repetition time period. In some embodiments, a receiver device may use the hash value to confirm the directory table. In some embodiments, the hash function may be applied to the directory table and the one or more LLS tables serially in the order to be broadcast in. In such embodiments where the hash function is applied serially, a receiver device may use the hash function to confirm the directory table and the presence of all tables in a correct order. In embodiments in which a hash function is applied across all tables to be sent in the broadcast stream, the hash may support signing. For example, a key value may be used as an additional input to the hash function to thereby sign the hash. In various embodiments, the presence of a hash type table may indicate to a receiver device that the hash type table is the first table of a set of LLS tables.

In some embodiments, a digital signature may be applied to the directory table and/or the one or more LLS tables to be broadcast to thereby sign the tables. Digital signatures may be any form of cryptographic elements used by broadcasters to authenticate broadcast transmissions. In various embodiments, the digital signature may be any type cryptographic signature that may enable authentication of the directory table and/or LLS tables, such as a signature according to one or more public key infrastructure (PKI) keys. In various embodiments, the digital signature may be indicated in a field of the directory table. As a specific example, the digital signature may be a cryptographic message syntax (CMS) signed data element indicated in a field of the directory table. The digital signature may itself be a type of certificate that matches certificates provided by a broadcaster to receiver devices so that the receiver devices may authenticate broadcast transmissions based on the broadcaster's digital signature being indicated, for example, in the directory table. In some embodiments, a receiver device may use the digital signature to confirm the directory table.

In some embodiments, broadcast service signaling may include calculating a CRC code for a portion of one or more LLS tables to be broadcast and indicating the CRC code in a broadcast stream of the one or more LLS tables. In some embodiments, the portion of the one or more LLS tables may be a first number of bytes of the one or more LLS tables, such as a first three bytes, a first four bytes, etc. In some embodiments, the portion of the one or more LLS tables may be all bytes of the one or more LLS tables. In some embodiments, a receiver device may compare a locally generated CRC code to the indicated CRC code to determine whether all of the one or more LLS tables to be broadcast have been received. In some embodiments, the CRC code may be calculated using at least byte values corresponding to three fields of each of the one or more LLS tables. As one example, an LLS table identifier field, an LLS group identifier field, and an LLS table version field of each LLS table may be used to calculate the CRC code. In some embodiments, the CRC function used to generate the CRC code may be an 8, 16, 32, or 64 bit function or other signaled width. When only three fields of each directory table and the one or more LLS tables are used with the signaled width CRC function, the additional eight bits may be padded.

Alternatively, a byte value of a further field, such as the byte value of the count field (e.g., a group_count_minus one field, an LLS table count field, etc.), may be used with the LLS table identifier field, the LLS group identifier field, and the LLS table version field to calculate the CRC code.

In some embodiments, the CRC code may be indicated in one of the LLS tables to be broadcast before that table is broadcast. For example, the CRC code may be indicated in a field or attribute added to one of the LLS tables. In some embodiments, a last one of the one or more LLS tables to be broadcast may be determined and the CRC code may be indicated in the last table to be broadcast. In some embodiments, the CRC type may be indicated in one of the LLS tables before the LLS tables are broadcast. The CRC type may indicate the CRC function used to calculate the CRC code. For example, the CRC type may be indicated in a field or attribute added to a first table of the one or more LLS tables to be broadcast. In various embodiments, the presence of a CRC type may indicate to a receiver device that the table with the CRC type is the first table of a set of LLS tables.

In some embodiments, a CRC table indicating the CRC code may be generated and broadcast with the one or more LLS tables together in a broadcast stream in each full repetition time period. For example, the CRC table may have an LLS table ID of "Set_CRC_Value." In various embodiments, the CRC table may be broadcast last in each full repetition time period. In various embodiments, the presence of a CRC table may indicate to a receiver device that the CRC table is an ending table of an LLS table set. In some embodiments, the CRC table may also indicate the CRC type. In some embodiments, a CRC type table may be generated indicating the CRC type. For example, the CRC table may have an LLS table ID of "CRC_Type." In some embodiments, a CRC type table may be broadcast first (e.g., before the one or more LLS tables and the Set_CRC_table) in each full repetition time period. In various embodiments, the presence of a CRC type table may indicate to a receiver device that the CRC type table is the first table of a set of LLS tables.

In some embodiments, a receiver device may use the CRC code to confirm that all LLS tables have been received. In some embodiments, the CRC code may be calculated on a per-PLP basis. In some embodiments, the CRC code may be calculated across all LLS tables for the same broadcast stream.

In some embodiments, broadcast service signaling may include applying a hash function to one or more LLS tables to be broadcast to generate a hash value and indicating the hash value in a broadcast stream of the one or more LLS tables. In such embodiments, a receiver device may compare a locally generated hash value to the indicated hash value to determine whether all of the one or more LLS tables to be broadcast have been received. In some embodiments, a hash function may be applied to the one or more LLS tables to be broadcast to generate a hash value. In some embodiments, the hash function may be applied to entire tables. In some embodiments, the hash function may only be applied to a portion of each table, such as the first four fields of the one or more LLS tables.

In some embodiments, the hash value may be indicated in one of the LLS tables to be broadcast before that table is broadcast. For example, the hash value may be indicated in a field or attribute added to one of the LLS tables. In some embodiments, a last one of the one or more LLS tables to be broadcast may be determined and the hash value may be indicated in the last table to be broadcast.

In some embodiments, a hash type may be indicated in one of the LLS tables before the LLS tables are broadcast. The hash type may indicate the applied hash function. For example, the hash type may be indicated in a field or attribute added to a first one or the one or more LLS tables to be broadcast. In various embodiments, the presence of a hash type may indicate to a receiver device that the table indicating the hash type is the first table of a set of LLS tables. In some embodiments, a hash table indicating the hash function applied to generate the hash value may be generated and broadcast with the one or more LLS tables together in a broadcast stream in each full repetition time period.

In some embodiments, the hash table may be broadcast last in each full repetition time period. In various embodiments, the presence of a hash table may indicate to a receiver device that the hash table is an ending table of an LLS table set. In some embodiments, the hash table may also indicate the hash type. In some embodiments, a hash type table may be generated indicating the hash type. In some embodiments, a hash type table may be broadcast first (e.g., before the one or more LLS tables and the hash table) in each full repetition time period. In some embodiments, a receiver device may use the hash value to confirm that all LLS tables have been received. In various embodiments, the presence of a hash type table may indicate to a receiver device that the hash type table is the first table of a set of LLS tables.

In some embodiments, the hash function may be applied to the one or more LLS tables serially in the order to be broadcast in. In such embodiments in which the hash function is applied serially, a receiver device may use the hash value to confirm the presence of all tables in a correct order. In some embodiments, the hash function may be applied to the LLS tables on a per-PYP basis. In some embodiments, the hash function may be applied to all LLS tables for the same broadcast stream. In embodiments in which a hash function is applied across all tables to be sent in the broadcast stream, the hash may support signing. For example, a key value may be used as an additional input to the hash function to thereby sign the hash.

In various embodiments, flags may be set in LLS tables to indicate an order the LLS tables are to be broadcast in. A server, such as a broadcaster server, may determine an order in which LLS tables will be broadcast. For example, a first LLS table to be broadcast may include a flag, such as a specified byte value in a field of the LLS table, indicating that LLS table is the first table to be broadcast. As another example, a last LLS table to be broadcast may include a flag, such as a specified byte value in a field of the LLS table, to indicating that LLS table is the last table to be broadcast. Flags may be set in any type LLS table, such as directory tables, CRC tables, CRC type tables, hash tables, hash type tables, SLTs, RRTs, system time fragments, AEATs, onscreen message notification fragments, etc. In such embodiments, a receiver device receiving LLS tables may determine a flag setting in one or more the received LLS tables. In some embodiments, determined flag settings may be used by the receiver device at least in part to determine whether a complete set of LLS tables has been received.

In some embodiments, additional LLS table identifiers (IDs) may indicate the directory tables, CRC tables (e.g., "Set_CRC_Value"), CRC type tables (e.g., "CRC_Type"), hash tables, and hash type tables. Such additional LLS table IDs may distinguish the type of the embodiment directory tables, CRC tables, CRC type tables, hash tables, and/or hash type tables from the LLS table IDs associated with SLTs (e.g., "SLT"), RRTs (e.g., "RRT"), system time fragments (e.g., "SystemTime"), AEATs (e.g., "AEAT"), and onscreen message notification fragments (e.g., "OnscreenMessageNotification").

In some embodiments, a series of LLS tables may be delivered as part of a random access point (RAP). An instance of LLS tables delivered for a RAP may be a table set. A table set need not include every type of LLS table. For example, an AEAT may not be included in every table set. In some embodiments, a CRC type table may indicate the start of a table set. In some embodiments, a CRC table may indicate the end of the table set. In this manner, a CRC type table and CRC table may enclose a table set for a RAP. The presence of a CRC type table and CRC table may enable a receiver device to identify tables associated with a RAP and to determine whether all relevant tables for that RAP have been delivered. The presence of a CRC type table and CRC table may enable a receiver device to identify tables associated with a RAP and to determine whether all relevant tables for that RAP have been delivered without waiting the entire full repetition time period, such as 5 seconds, to be completed.

FIG. 1 illustrates a system 100 suitable for use with the various embodiments. The system 100 may include multiple devices, such as one or more gateways 102, one or more personal devices 106 (e.g., a tablet), one or more televisions 103, one or more service provider servers 112, one or more broadcaster servers 110, and one or more broadcast transmitters 113.

The broadcast transmitter 113 may broadcast Over-the-Air (OTA) transmissions of broadcast content 107, such as OTA transmissions of broadcast television services transmitted according to a broadcast standard, such as the ATSC standards (e.g., ATSC 3.0, etc.), DVB standards, 3GPP standards (e.g., enhance Multimedia Broadcast and Multicast System (eMBMS) over Long Term Evolution (LTE), Fifth Generation (5G), LTE enhanced Television (enTV), 5G enTV, etc.), etc. The broadcast content may be received at the broadcast transmitter 113 from the broadcaster server 110 and the broadcaster server 110 may control the operations of the broadcast transmitter 113 to generate the OTA transmissions of broadcast content 107. As an example, the OTA transmissions of broadcast content 107 may include one or more broadcast streams each corresponding to different radio frequency (RF) channels, such as very high frequency (VHF) channels, ultra-high frequency (UHF) channels, etc., defined by a carrier frequency centered within a specified bandwidth, such as 6 megahertz (MHz). As another example, the OTA transmissions of broadcast content 107 may include broadcast streams transported via one or more RF signals in a cellular network (e.g., Code Division Multiple Access (CDMA) network, Time Division Multiple Access (TDMA network), Global System for Mobile Communications (GSM) network, (Personal Communications Service (PCS) network, $3^{rd}$ Generation (3G) network, $4^{th}$ Generation (4G) network, LTE network, 5G network, or any other type of cellular network). Each broadcast stream may include one of more PLPs.

Each broadcast stream may provide one or more services. In various embodiments, the services, such as broadcast television services transmitted according to the ATSC standards (e.g., ATSC 3.0, etc.), broadcast television services transmitted according to the DVB standards, broadcast television services transmitted according to the 3GPP standards (e.g., eMBMS over LTE, LTE enTV, 5G enTV, etc.), etc., may be provided by the service provider servers 112 to the broadcaster server 110 for transmission by the broadcaster server 110. For example, a service provider server 112 may be a server of a television production company providing a television program and the broadcaster server 110 may be a server of a local affiliate broadcasting the television program in a local area according to the ATSC standards (e.g., ATSC 3.0, etc.). As another example, a service provider server 112 may be a server of a television production company providing a television program and the broadcaster server 110 may be a Broadcast Multicast Service Center (BM-SC) server broadcasting the television program to computing devices in an eMBMS network.

The broadcaster server 110 may be connected to the service provider servers 112 directly (e.g., via one or more local wired or wireless connections, etc.) and/or indirectly (e.g., via one or more wired or wireless connections to the Internet 105, etc.). While illustrated as separate devices in FIG. 1, in an alternative configuration the service provider servers 112 may be components of the broadcaster server 110 and/or may share one or more components with the broadcaster server 110.

The OTA transmissions of broadcast content 107 may be received by various computing devices configured with antennas to receive the OTA transmissions of broadcast content 107, such as a gateway 102, a smart phone 106, and/or a television 103. The computing devices, such as the gateway 102, the smart phone 106, and/or the television 103, may be configured to acquire the services, such as broadcast television services, etc., within the OTA transmission of broadcast content 107 according to the ATSC standards (e.g., ATSC 3.0, etc.), the DVB standards, the 3GPP standards (e.g., eMBMS over LTE, 5G, LTE enTV, 5G enTV, etc.), etc. The content of the services, such as broadcast television content, may be output to a user of the device, such as the gateway 102, the smart phone 106, and/or the television 103.

In some configurations, each device, such as the gateway 102, the smart phone 106, and/or the television 103, may receive the OTA transmissions of broadcast content 107 directly and consume the services therein.

In other configurations, the computing devices, such as the gateway 102, the smart phone 106, and/or the television 103, may be connected, such as via wired and/or wireless connections, and one device may receive the OTA transmissions of broadcast content 107 and output the content to another device for display to a user. For example, the gateway 102 may optionally be connected to the television 103 via a High Definition Multimedia Interface (HDMI) connection and may output content to the television 103 for display to a user. As another example, the gateway 102 may optionally be connected to the user device 106 via a Bluetooth® connection and may output content to the user device 106 for display to a user.

In other configurations, the computing devices, such as the gateway 102, the smart phone 106, and/or the television 103, may be components of one another and/or may share one or more component with the television one another. For example, the gateway 102 may share an antenna with the television 103. As another example, the gateway 102 may be located within the television 103.

In various embodiments, the computing devices, such as the gateway 102, the smart phone 106, and/or the television 103, may be connected, via wired and/or wireless connections, to the Internet 105.

Figure 2:
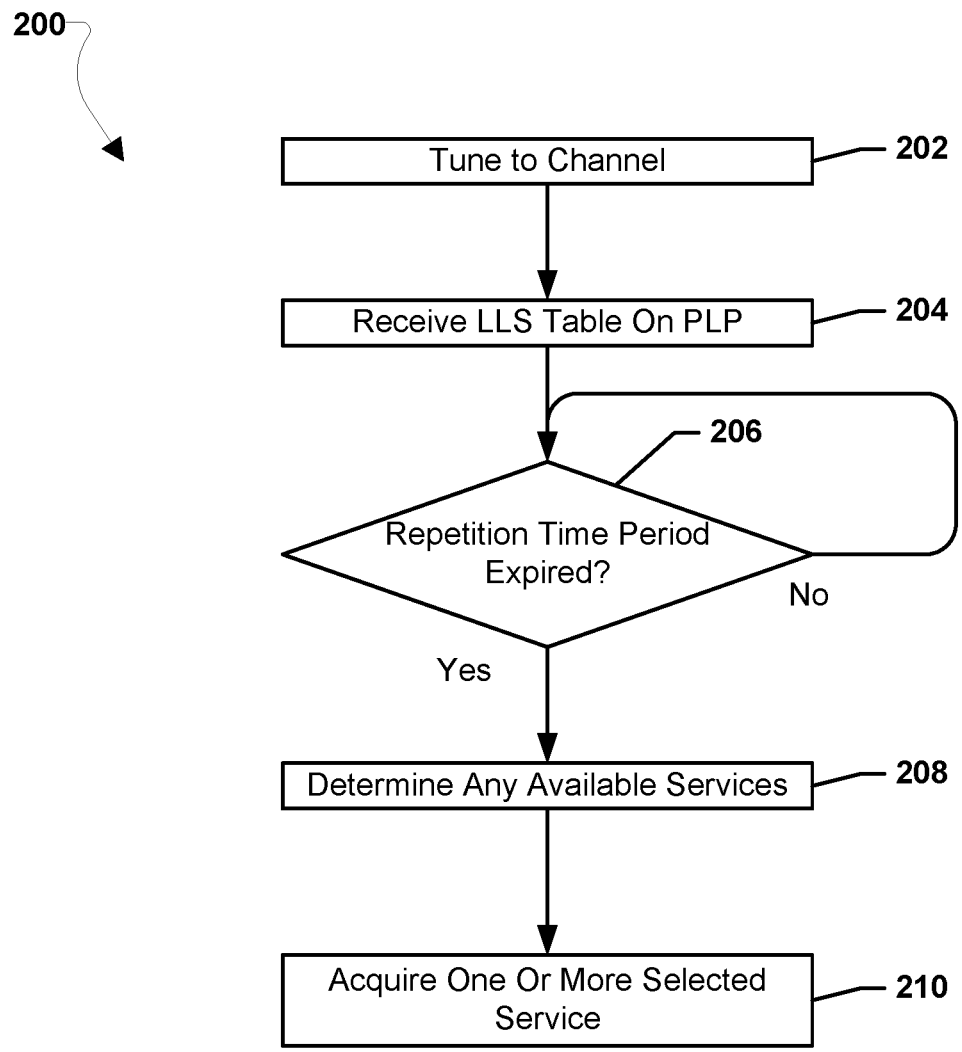
FIG. 2 is a process flow diagram illustrating a method for determining available broadcast services.

FIG. 2 illustrates a method 200 for determining available broadcast services and acquiring one or more selected service according to some embodiments. The operations of the method 200 may be performed by a processor of a receiver device, such as gateway 102, smart phone 106, television 103, etc.

With reference to FIGS. 1-2, in block 202 the processor may tune to a channel. In various embodiments, a channel may be a RF channel, such as VHF channel, UHF channel, etc., defined by a carrier frequency centered within a specified bandwidth, such as 6 MHz. In various embodiments, a channel may be an RF signal of a cellular network (e.g., CDMA, TDMA, Global System for GSM, PCS, 3G, 4G, LTE, 5G, or any other type of cellular network). A channel may correspond to a broadcast stream of OTA transmissions of broadcast content. A channel may include one or more PLPs. A channel (e.g., a broadcast stream) may provide one or more service. In various embodiments, the services may be broadcast television services transmitted according to the ATSC standards (e.g., ATSC 3.0, etc.), broadcast television services transmitted according to the DVB standards, broadcast television services transmitted according to the 3GPP standards (e.g., eMBMS over LTE, 5G, LTE enTV, 5G enTV, etc.), etc.

In block 204 the processor may receive an LLS table on a PLP. A PLP may be a portion of the channel that has certain modulation and coding parameters. PLPs may be mapped to Internet Protocol (IP) over the air addresses/ports associated with services, such as services broadcast according to the ATSC standards (e.g., ATSC 3.0, etc.), the DVB standards, the 3GPP standards (e.g., eMBMS over LTE, 5G, LTE enTV, 5G enTV, etc.), etc. LLS tables may be carried in IP packets with address/port dedicated to receiving LLS tables. LLS tables may include SLTs, RRTs, system time fragments, AEATs, and onscreen message notification fragments. A complete set of LLS tables may be needed to enable the available services on the channel to be determined. A complete set of LLS tables include one or more SLTs, one or more RRTs, one or more system time fragments, one or more AEATs, and/or one or more onscreen message notification fragments, but no specific type or minimum number of LLS tables may be needed to constitute a complete set of LLS tables. For example, a single SLT may constitute a complete set of LLS tables in some instances, while in others multiple SLTs and a system time fragment may constitute a complete set.

In determination block 206, the processor may determine whether a repetition time period has expired. A repetition time period, such as 5 seconds, may be the periodicity at which LLS table broadcasts are repeated in a broadcast system. Waiting the full repetition time period after receiving an LLS table may ensure that all LLS tables have been received. If the repetition time period has not expired (i.e., determination block 206="No"), the processor may continue to wait for the repetition time period to expire in determination block 206.

In response to the repetition time period expiring (i.e., determination block 206="Yes"), the processor may determine any available services in block 208. For example, the available services may be services for the channel listed in the SLT tables received. In block 210 the processor may acquire one or more of the selected services. For example, the processor may begin decoding packets for the one or more selected services received on the channel and consuming the broadcast content in the decoded packets, for example by displaying the broadcast content to a user.

Figure 3:
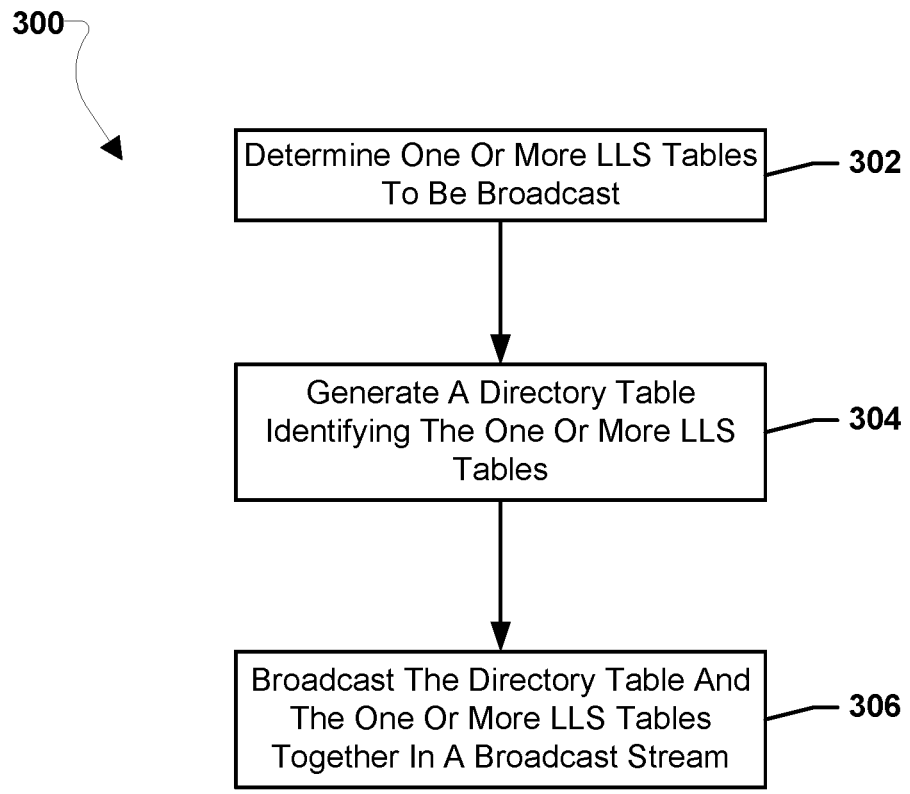
FIG. 3 is a process flow diagram illustrating an embodiment method for broadcast service signaling.

FIG. 3 illustrates an embodiment method 300 for broadcast service signaling according to some embodiments. The operations of the method 300 may be performed by a processor of a server, such as broadcaster server 110, etc.

With reference to FIGS. 1-3, in block 302 the server may determine one or more LLS tables to be broadcast. The one or more LLS tables to be broadcast may include one or more SLTs, one or more RRTs, one or more system time fragments, one or more AEATs, and/or one or more onscreen message notification fragments. The one or more LLS tables may be LLS tables sent to the server from another computing device, such as a service provider server 112, and/or may be LLS tables generated by the server itself.

In block 304 the server may generate a directory table identifying the one or more LLS tables. In various embodiments, the directory table may identify the one or more LLS tables to be broadcast by type and group. In various embodiments, the directory table may be a directory for the LLS tables carried on a single PLP. In various embodiments, the directory table may be a directory of all LLS tables of a broadcast stream. The directory table may itself be a type of LLS table and may include a group ID associated with the determined one or more LLS tables to be broadcast.

In block 306 the server may broadcast the directory table and the one or more LLS tables together in a broadcast stream. For example, the server may broadcast the directory table and the one or more LLS tables by controlling the operations of a broadcast transmitter to generate OTA transmissions of broadcast content including the one or more LLS tables and the directory table. In some embodiments, the one or more LLS tables may be broadcast before the directory table in each full repetition time period.

Figure 4:
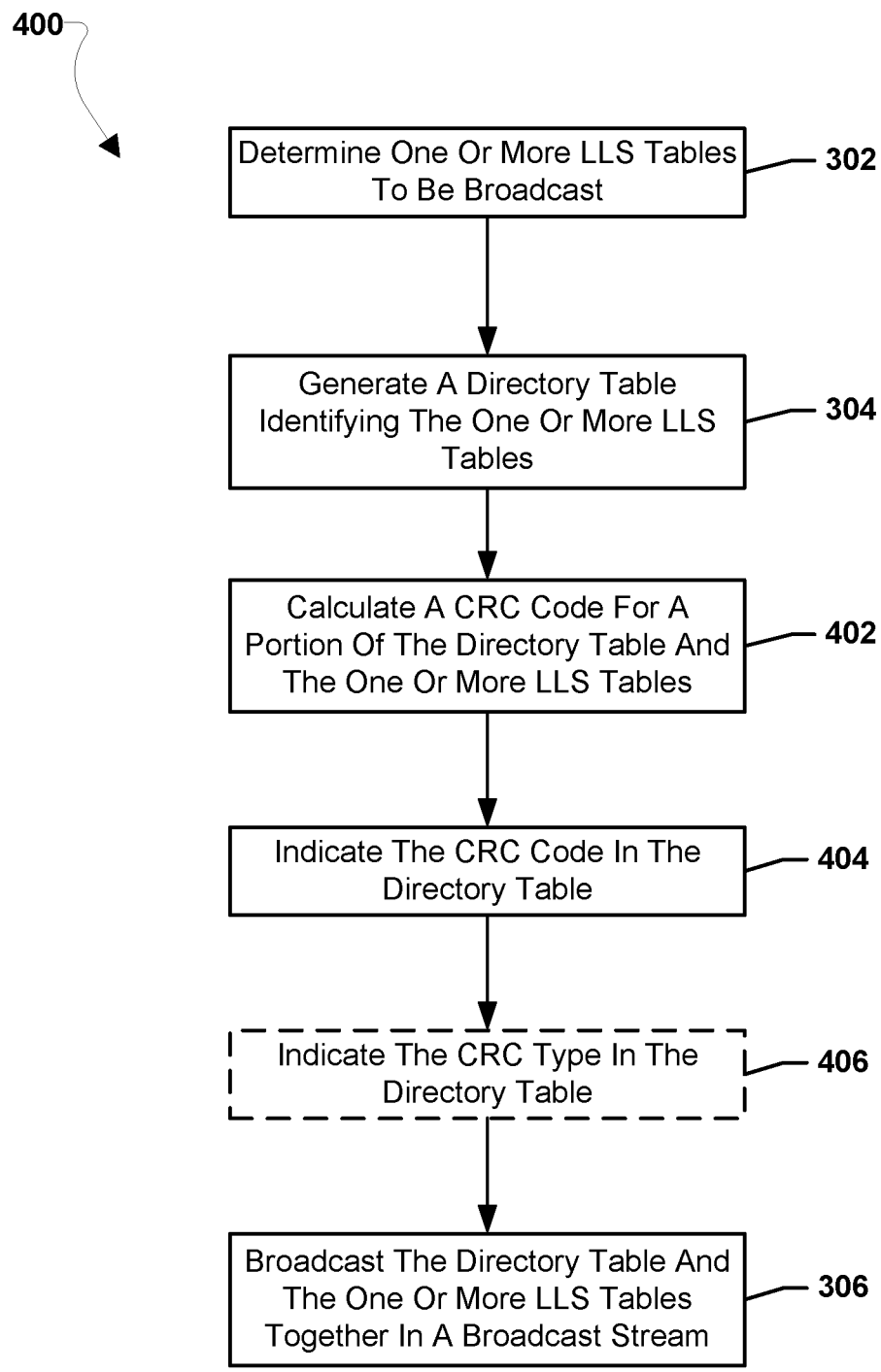
FIG. 4 is a process flow diagram illustrating another embodiment method for broadcast service signaling.

FIG. 4 illustrates an embodiment method 400 for broadcast service signaling according to some embodiments. The operations of the method 400 may be performed by a processor of a server, such as broadcaster server 110, etc.

With reference to FIGS. 1-4, in blocks 302 and 304, the server may perform operations of like numbered blocks of method 300 described with reference to FIG. 3.

In block 402, the server may calculate a CRC code for a portion of the directory table and the one or more LLS tables. In various embodiments, a portion of the directory table and the one or more LLS tables may be used to calculate the CRC. In various embodiments, the portion may be a first number of bytes, such as a first three bytes, a first four bytes, etc. In various embodiments, the portion may be all bytes of the directory table and one or more LLS tables. In various embodiments, the CRC code may be calculated using at least byte values corresponding to three fields of each of the directory table and the one or more LLS tables. As one example, an LLS table identifier field, an LLS group identifier field, and an LLS table version field of each table (e.g., the directory table and the one or more LLS tables) may be used to calculate the CRC code. In some embodiments, the CRC function used to generate the CRC code may be an 8, 16, 32, or 64 bit or other integer byte width function. Alternatively, a byte value of a further field, such as the byte value of the count field (e.g., a group_count_minus one field, an LLS table count field, etc.) may be used with the LLS table identifier field, the LLS group identifier field, and the LLS table version field to calculate the CRC code. Including the group_count_minus one, may simplify the computation because the value for group_count_minus one would otherwise have to be skipped when using the LLS table identifier field, the LLS group identifier field, and the LLS table version field of each table as the group_count_minus one field may be between the LLS group identifier field and the LLS table version field.

In block 404, the server may indicate the CRC code in the directory table. In various embodiments, the CRC code may be indicated in the directory table before the directory table is broadcast. For example, the CRC code may be indicated in a field or attribute added to the directory table.

In optional block 406, the server may indicate the CRC type in the directory table. Block 406 may be optional as the CRC type may not need to be indicated as receiver devices may already be aware of the CRC type used (e.g., a single default CRC type may be used). In various embodiments, the CRC type may be indicated in the directory table before the directory table is broadcast. The CRC type may indicate the CRC function used to calculate the CRC code. For example, the CRC type may be indicated in a field or attribute added to the directory table.

In block 306, the server may broadcast the directory table and the one or more LLS tables together in the broadcast stream by performing operations of the like numbered block of the method 300 described with reference to FIG. 3.

Figure 5:
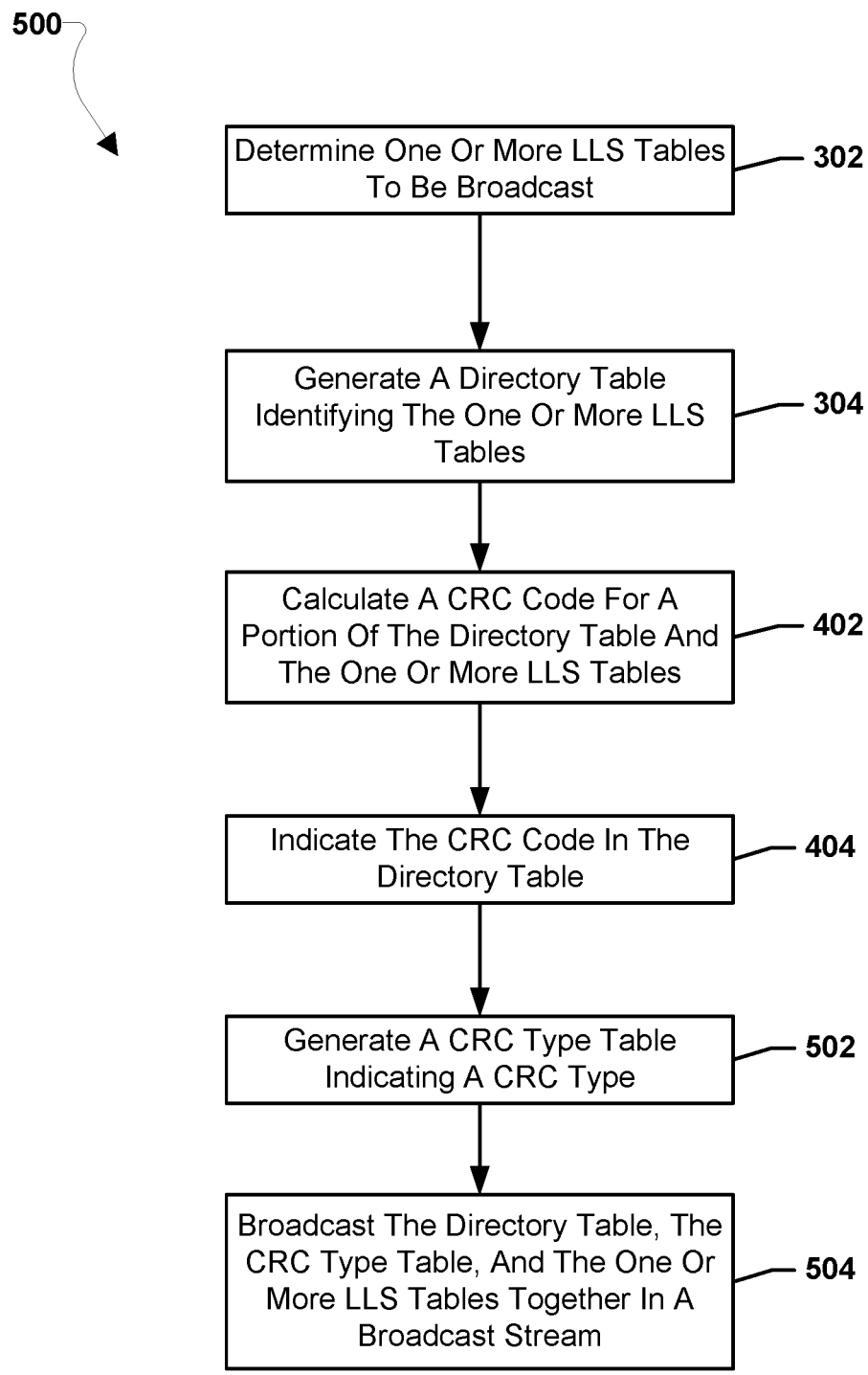
FIG. 5 is a process flow diagram illustrating another embodiment method for broadcast service signaling.

FIG. 5 illustrates an embodiment method 500 for broadcast service according to some embodiments. The operations of the method 500 may be performed by a processor of a server, such as broadcaster server 110, etc.

With reference to FIGS. 1-5, in blocks 302, 304, 402, and 404 the server may perform operations of like numbered blocks of methods 300 (FIG. 3) and 400 (FIG. 4).

In block 502, the server may generate a CRC type table indicating a CRC type. The CRC type may indicate the CRC function used to calculate the CRC code. The CRC type may be indicated in a field or attribute of the CRC type table. The CRC type table may itself be a type of LLS table and may include a group ID associated with the determined one or more LLS tables to be broadcast.

In block 504, the server may broadcast the directory table, the CRC type table, and the one or more LLS tables together in a broadcast stream. For example, the server may broadcast the directory table, the CRC type table, and the one or more LLS tables by controlling the operations of a broadcast transmitter to generate OTA transmissions of broadcast content including the one or more LLS tables, the directory table, and the CRC type table. In some embodiments, the CRC type table may be broadcast first before the one or more LLS tables may be broadcast and before the directory table in each full repetition time period. In various embodiments, the presence of a CRC type table may indicate to a receiver device that the CRC type table is the first table of a set of LLS tables.

Figure 6:
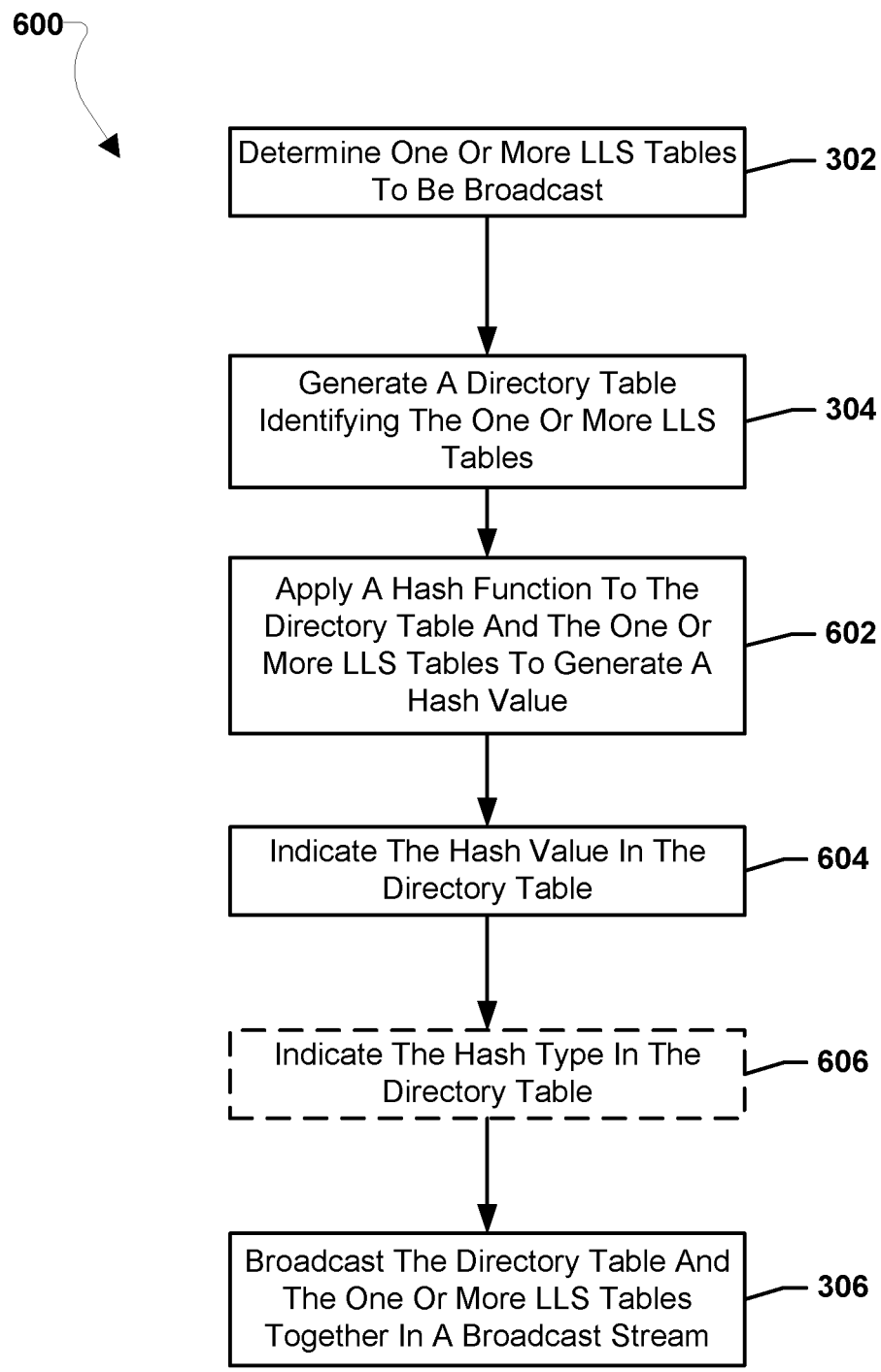
FIG. 6 is a process flow diagram illustrating another embodiment method for broadcast service signaling.

FIG. 6 is a process flow diagram illustrating another embodiment method for broadcast service signaling according to some embodiments. The operations of the method 600 may be performed by a processor of a server, such as broadcaster server 110, etc.

With reference to FIGS. 1-6, in blocks 302 and 304 the server may perform operations of like numbered blocks of method 300 (FIG. 3).

In block 602, the server may apply a hash function to the directory table and the one or more LLS tables to generate a hash value. In some embodiments, the hash function may be applied to entire tables. In some embodiments, the hash function may only be applied to a portion of each table, such as the first four fields of the directory table and the first four fields of the one or more LLS tables.

In block 604, the server may indicate the hash value in the directory table. In various embodiments, the hash value may be indicated in the directory table before the directory table is broadcast. For example, the hash value may be indicated in a field or attribute added to the directory table.

In optional block 606, the processor may indicate the hash type in the directory table. Block 606 may be optional as the hash type may not need to be indicated as receiver devices may already be aware of the hash function applied (e.g., a single default hash function may be used). In various embodiments, a hash type may be indicated in the directory table before the directory table is broadcast. The hash type may indicate the applied hash function. For example, the hash type may be indicated in a field or attribute added to the directory table.

In block 306, the server may broadcast the directory table and the one or more LLS tables together in the broadcast stream by performing operations of the like numbered block of the method 300 described with reference to FIG. 3.

Figure 7:
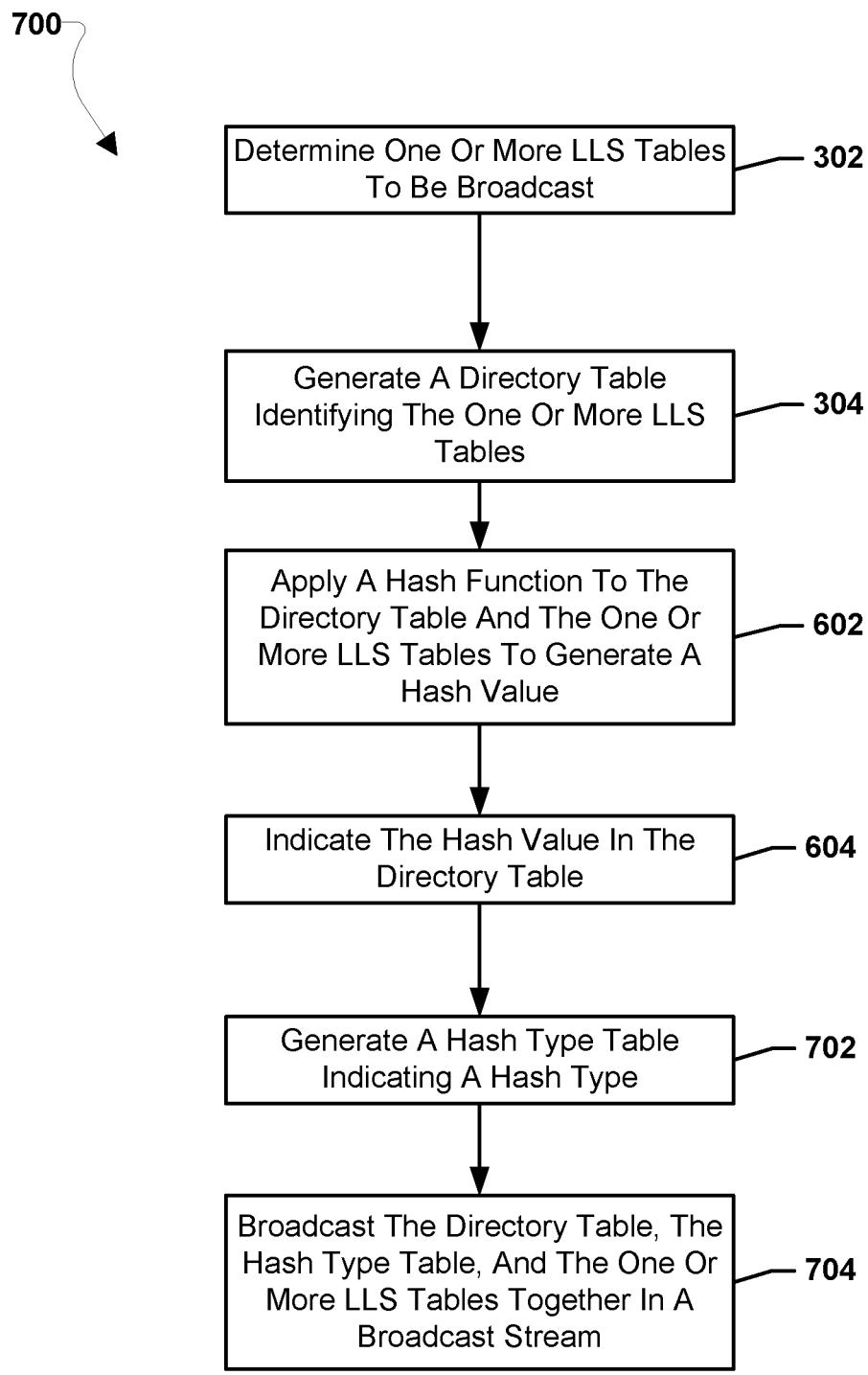
FIG. 7 is a process flow diagram illustrating another embodiment method for broadcast service signaling.

FIG. 7 illustrates an embodiment method 700 for broadcast service signaling according to some embodiments. The operations of the method 700 may be performed by a processor of a server, such as broadcaster server 110, etc.

With reference to FIGS. 1-7, in blocks 302, 304, 602, and 604 the server may perform operations of like numbered blocks of methods 300 (FIG. 3) and 600 (FIG. 6).

In block 702, the server may generate a hash type table indicating a hash type. The hash type may indicate the hash function applied to generate the hash value. The hash type may be indicated in a field or attribute of the hash type table. The hash type table may itself be a type of LLS table and may include a group ID associated with the determined one or more LLS tables to be broadcast.

In block 704, the server may broadcast the directory table, the hash type table, and the one or more LLS tables together in a broadcast stream. For example, the server may broadcast the directory table, the hash type table, and the one or more LLS tables by controlling the operations of a broadcast transmitter to generate OTA transmissions of broadcast content including the one or more LLS tables, the directory table, and the hash type table. In some embodiments, the hash type table may be broadcast first before the one or more LLS tables may be broadcast and before the directory table in each full repetition time period. In various embodiments, the presence of a hash type table may indicate to a receiver device that the hash type table is the first table of a set of LLS tables.

Figure 8:
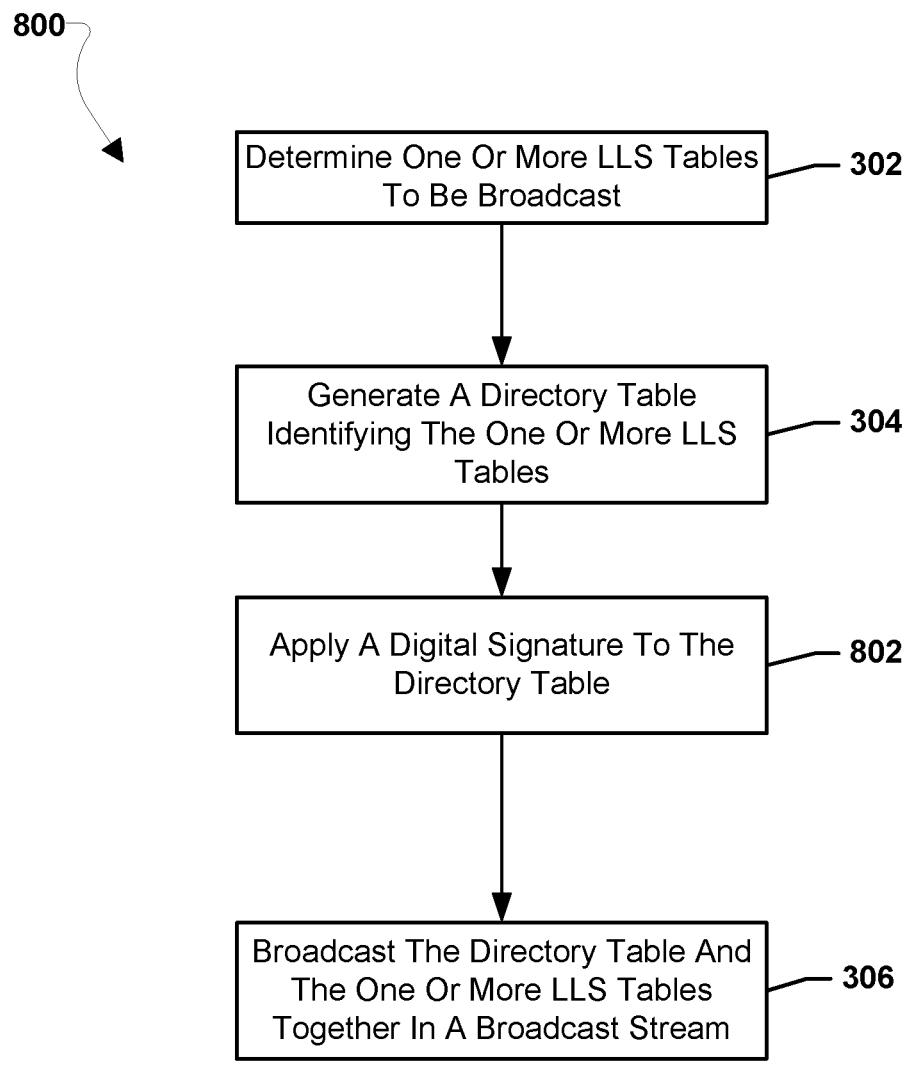
FIG. 8 is a process flow diagram illustrating another embodiment method for broadcast service signaling.

FIG. 8 illustrates an embodiment method 800 for broadcast service signaling according to some embodiments. The operations of the method 800 may be performed by a processor of a server, such as broadcaster server 110, etc.

With reference to FIGS. 1-8, in blocks 302 and 304 the server may perform operations of like numbered blocks of method 300 as described with reference to FIG. 3.

In block 802, the server may apply a digital signature to the directory table. In various embodiments, the digital signature may be any type cryptographic signature that may enable authentication of the directory table, such as a signature according to one or more PKIs. Digital signatures may be cryptographic elements used by broadcasters to authenticate broadcast transmissions. In various embodiments, the digital signature may be indicated in a field of the directory table. As a specific example, the digital signature may be a CMS signed data element. The digital signature may itself be a type of certificate that matches certificates provided by a broadcaster to receiver devices so that the receiver devices may authenticate broadcast transmissions based on the broadcaster's digital signature being indicated, for example, in the directory table.

In block 306, the server may broadcast the directory table and the one or more LLS tables together in the broadcast stream by performing operations of the like numbered block of the method 300 as described with reference to FIG. 3.

Figure 9:
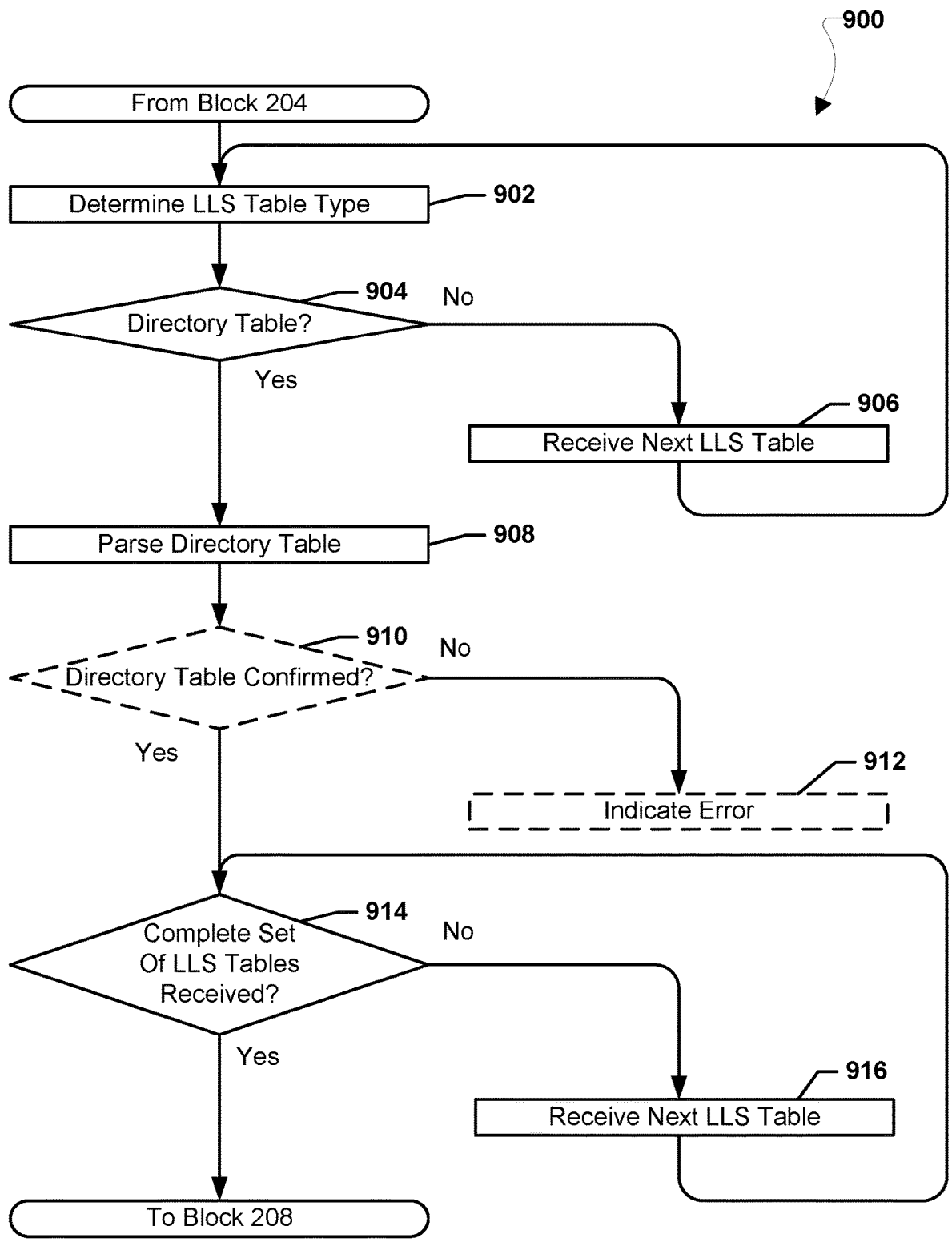
FIG. 9 is a process flow diagram illustrating an embodiment method for determining completeness of low level signaling tables.

FIG. 9 illustrates an embodiment method 900 for determining completeness of low level signaling tables according to some embodiments. The operations of method 900 may be performed by a processor of a receiver device, such as gateway 102, smart phone 106, television 103, etc. In various embodiments, the operations of method 800 may be performed as part of method 200 (FIG. 2), for example in addition to, or in place of, the operation 206.

With reference to FIGS. 1-9, in block 902 the processor may determine the LLS table type. For example, the processor may parse a portion of the received LLS table to determine the table type. For example, the first field of the LLS table may be an LLS table identifier (e.g., "LLS_table_id"). The byte value in the field may indicate whether the LLS table is a directory table, CRC table, CRC type table, hash table, hash type table, SLT, RRT, system time fragment, AEAT, or onscreen message notification fragment.

In determination block 904, the processor may determine whether the received LLS table is a directory table. For example, the processor may compare the byte value in the LLS table ID field of the received LLS table to a known byte value assigned to directory tables to determine whether the received LLS table is a directory table. In response to determining the received table is not a directory table (i.e., determination block 904="No"), the processor may receive the next LLS table in block 906. The processor may determine the LLS type of that next LLS table in block 902.

In response to determining the received LLS table is a directory table (i.e., determination block 904="Yes"), the processor may parse the directory table in block 908. Parsing the directory table may enable the processor to identify all groups and types of LLS tables listed in the directory. Additionally, the processor may identify any CRC codes, hash values, CRC types, and/or hash types indicating in the directory table via the parsing.

In optional determination block 910, the processor may determine whether the directory table is confirmed. In various embodiments, the directory table may include a CRC code, a hash value, and/or a digital signature. Block 910 may be optional as not all directory tables may include a CRC code, a hash value, and/or a digital signature. The processor may confirm the directory table by computing a CRC code and comparing CRC code to the CRC code indicated in the directory table when the directory table includes a CRC code. The processor may confirm the directory table by generating a hash value by applying a hash function and comparing the generated hash value to the hash value indicated in the directory table. The processor may confirm the directory table by comparing the digital signature in the directory table to a certificate associated with LLS tables and/or broadcasters of LLS tables, such as a PKI certificate. For example, broadcasters may pre-provision certificates to receiver devices to enable the receiver devices to authenticate broadcast transmissions as originating from a specific broadcaster. A mismatch between the CRC codes, hash values, and/or digital signature may indicate the directory table is not confirmed. Directory tables may be unconfirmed due to various occurrences, such as transmission errors, signature errors, missing data, etc. In response to the directory table being unconfirmed (i.e., determination block 910="No"), the processor may indicate an error in block 912.

In response to confirming the directory table (i.e., determination block 908="Yes") or in response to parsing the directory table in block 908, the processor may determine whether a complete set of LLS tables is received in determination block 914. The processor may compare the LLS tables identified in the LLS table to the LLS tables present in memory to determine whether all the LLS tables identified in the directory are present in memory. In some situations, though the LLS table received may be the first LLS table received since the channel was tuned to, the receiver device may have been previously tuned to the channel and may already have stored LLS tables in memory. In such situations, the receiver device may be able to confirm whether the previously stored LLS tables are a complete set merely by receiving the directory table.

In response to determining that the complete set has not been received (i.e., determination block 914="No"), the processor may receive the next LLS table in block 916. In block 914, the processor may determine whether the set of LLS tables is complete. In this manner, as tables are received the set of received tables may be checked until it is complete.

In response to determining the complete set of LLS tables has been received (i.e., determination block 914="Yes"), the processor may proceed to block 208

Figure 10:
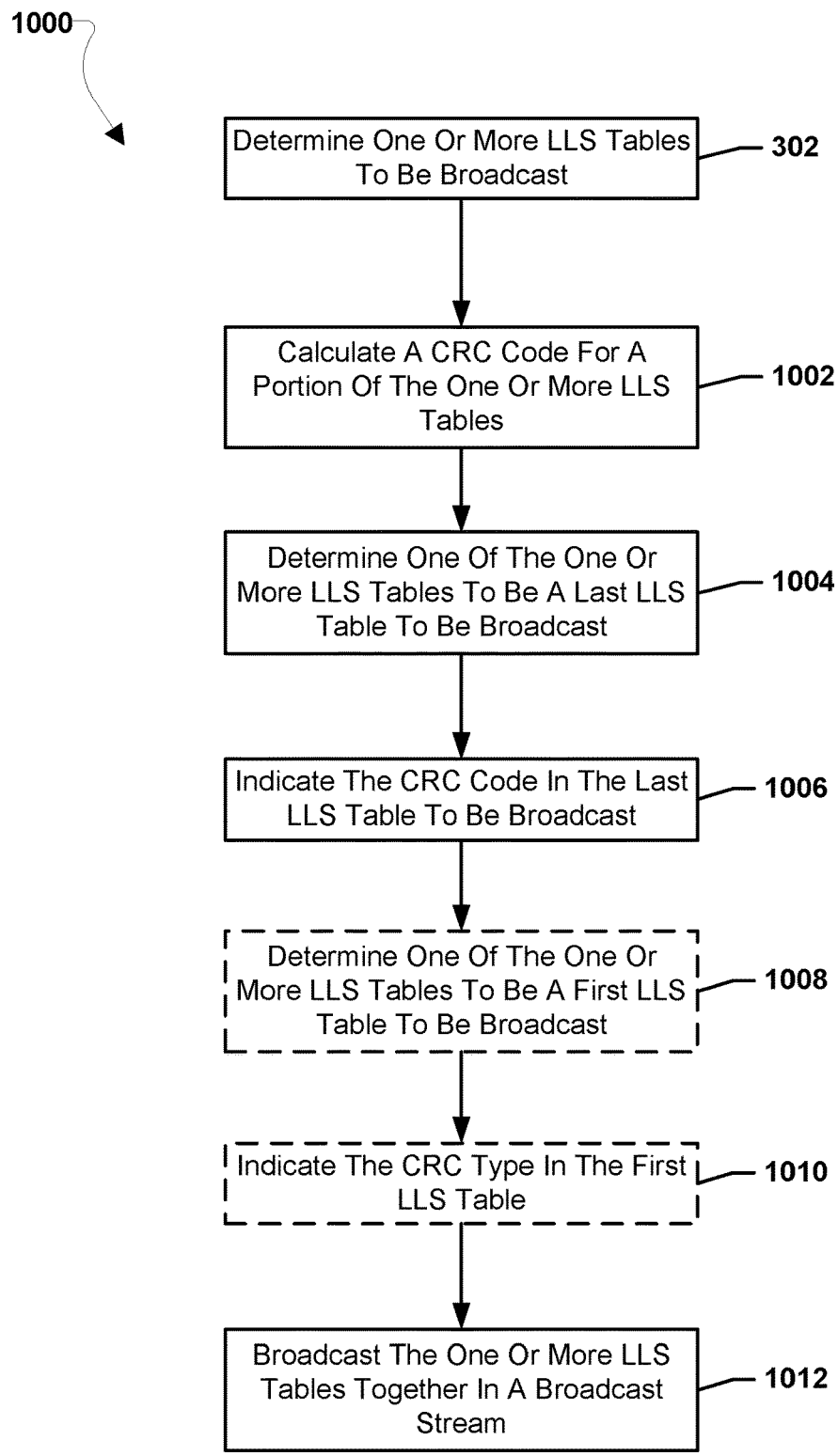
FIG. 10 is a process flow diagram illustrating another embodiment method for broadcast service signaling.

FIG. 10 illustrates an embodiment method 1000 for broadcast service signaling according to some embodiments. The operations of the method 1000 may be performed by a processor of a server, such as broadcaster server 110, etc.

With reference to FIGS. 1-10, in block 302 the server may perform operations of like numbered block of the method 300 as described with reference to FIG. 3.

In block 1002, the server may calculate a CRC code for a portion of the one or more LLS tables. In some embodiments, the portion of the one or more LLS tables may be a first number of bytes of the one or more LLS tables, such as a first three bytes, a first four bytes, etc. In some embodiments, the portion of the one or more LLS tables may be all bytes of the one or more LLS tables. In various embodiments, the CRC code may be calculated using at least byte values corresponding to three fields of each of the one or more LLS tables. As one example, an LLS table identifier field, an LLS group identifier field, and an LLS table version field of each LLS table may be used to calculate the CRC code. In some embodiments, the CRC function used to generate the CRC code may be an 8, 16, 32, or 64 bit function. When only three fields of each of the one or more LLS tables are used with the 32 bit CRC function, a byte value of a further field, such as the byte value of the group count minus one field, may be used with the LLS table identifier field, the LLS group identifier field, and the LLS table version field to calculate the CRC code.

In block 1004, the server may determine one of the one or more LLS tables to be a last LLS table to be broadcast. In various embodiments, the LLS tables may be broadcast in a repeating sequence and the last LLS table may be the last LLS table broadcast before the sequence repeats.

In block 1006, the server may indicate the CRC code in the last LLS table to be broadcast. For example, the CRC code may be indicated in a field or attribute added to one of the LLS tables. In various embodiments, the presence of a CRC table may indicate to a receiver device that the CRC table is an ending table of an LLS table set.

In optional block 1008, the server may determine one of the one or more LLS tables to be a first LLS table to be broadcast. In various embodiments, the LLS tables may be broadcast in a repeating sequence and the last LLS table may be the first LLS table broadcast each time the sequence repeats.

In optional block 1010, the server may indicate the CRC type in the first LLS table, such as the first LLS table of a set. For example, the CRC code may be indicated in a field or attribute added to the first LLS table. The CRC type may indicate the CRC function used to calculate the CRC code.

Blocks 1008 and 1010 may be optional as the CRC type may not need to be indicated as receiver devices may already be aware of the CRC type used (e.g., a single default CRC type may be used).

In block 1012, the server may broadcast the one or more LLS tables together in a broadcast stream. For example, the server may broadcast the one or more LLS tables by controlling the operations of a broadcast transmitter to generate OTA transmissions of broadcast content including the one or more LLS tables.

Figure 11:
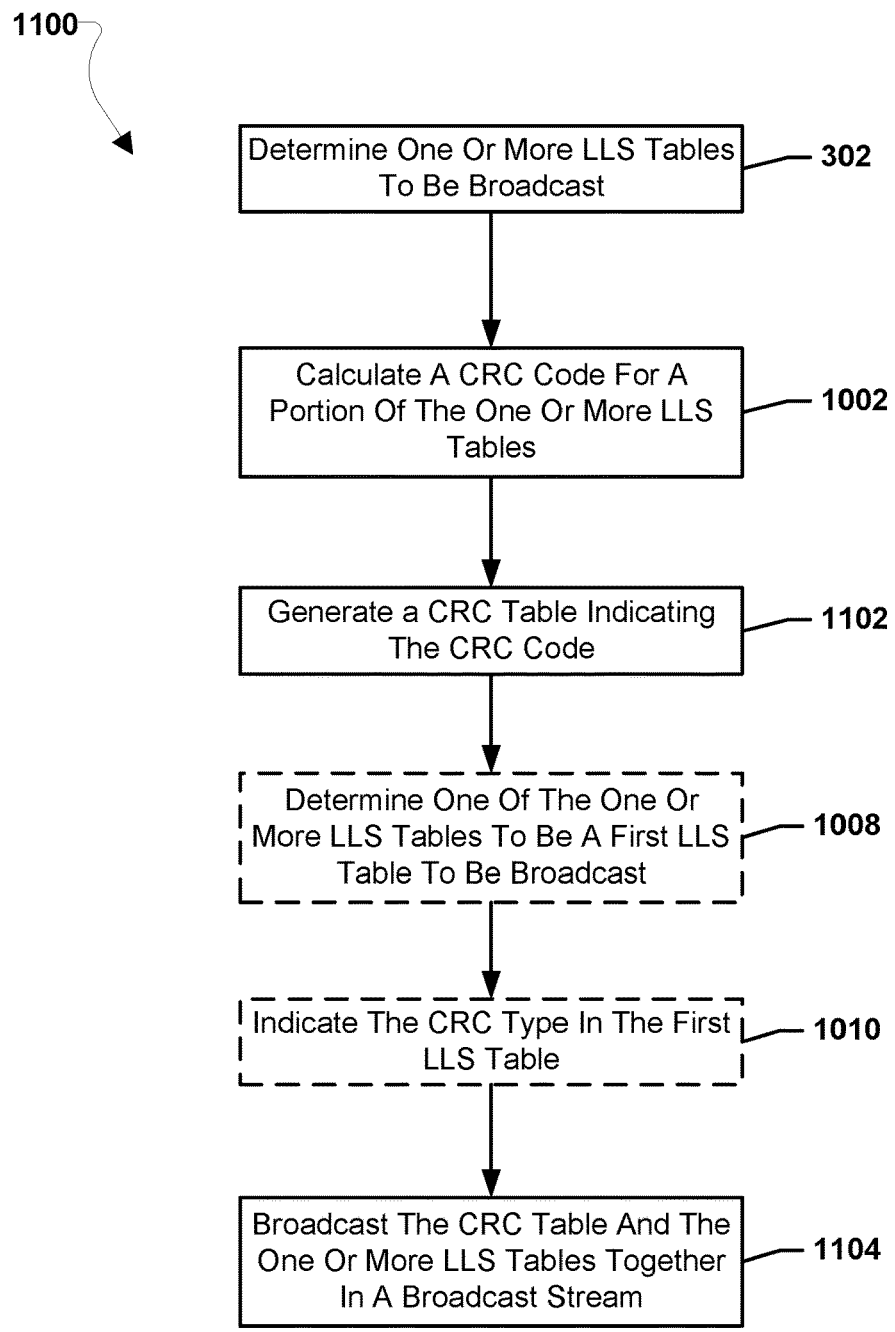
FIG. 11 is a process flow diagram illustrating another embodiment method for broadcast service signaling.

FIG. 11 illustrates an embodiment method 1100 for broadcast service signaling according to some embodiments. The operations of the method 1100 may be performed by a processor of a server, such as broadcaster server 110, etc.

With reference to FIGS. 1-11, in blocks 302 and 1002 the server may perform operations of like numbered blocks of methods 300 as described with reference to FIGS. 3 and 1000 as described with reference to FIG. 10.

In block 1102, the server may generate a CRC table indicating the CRC code. In various embodiments, the CRC table may indicate the CRC code calculated for the one or more LLS tables. The CRC table may itself be a type of LLS table and may include a group ID associated with the determined one or more LLS tables to be broadcast.

In blocks 1008 and 1010, the server may perform operations of like numbered blocks of method 1000 as described with reference to FIG. 10.

In block 1104, the server may broadcast the CRC table and the one or more LLS tables together in a broadcast stream. For example, the server may broadcast the CRC table and the one or more LLS tables by controlling the operations of a broadcast transmitter to generate OTA transmissions of broadcast content including the one or more LLS tables and the CRC table. In various embodiments, a CRC table indicating the CRC code may be generated and broadcast with the one or more LLS tables together in a broadcast stream in each full repetition time period. In various embodiments, the CRC table may be broadcast last in each full repetition time period.

Figure 12:
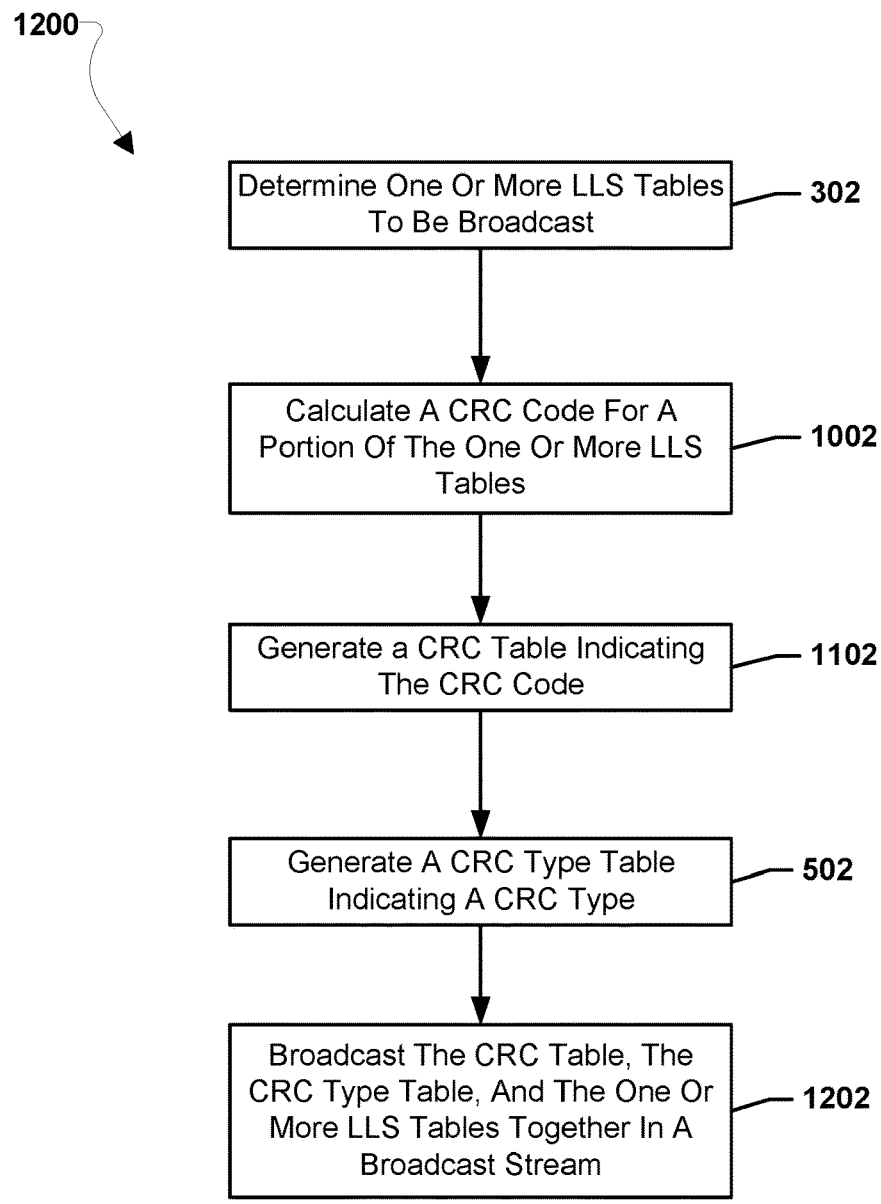
FIG. 12 is a process flow diagram illustrating another embodiment method for broadcast service signaling.

FIG. 12 illustrates an embodiment method 1200 for broadcast service signaling according to some embodiments. The operations of the method 1200 may be performed by a processor of a server, such as broadcaster server 110, etc.

With reference to FIGS. 1-12, in blocks 302, 1002, 1102, and 502 the server may perform operations of like numbered blocks of methods 300 (FIG. 3), 500 (FIG. 5), 1000 (FIG. 10), and 1200 (FIG. 12).

In response to generating a CRC type table, the server may broadcast the CRC table, the CRC type table, and the one or more LLS tables together in a broadcast stream in block 1202. For example, the server may broadcast the CRC table, the CRC type table, and the one or more LLS tables by controlling the operations of a broadcast transmitter to generate OTA transmissions of broadcast content including the one or more LLS tables, the CRC table, and the CRC type table. In some embodiments, the CRC type table may be broadcast first before the one or more LLS tables may be broadcast and before the CRC table in each full repetition time period. In various embodiments, the presence of a CRC type table may indicate to a receiver device that the CRC type table is the first table of a set of LLS tables.

Figure 13:
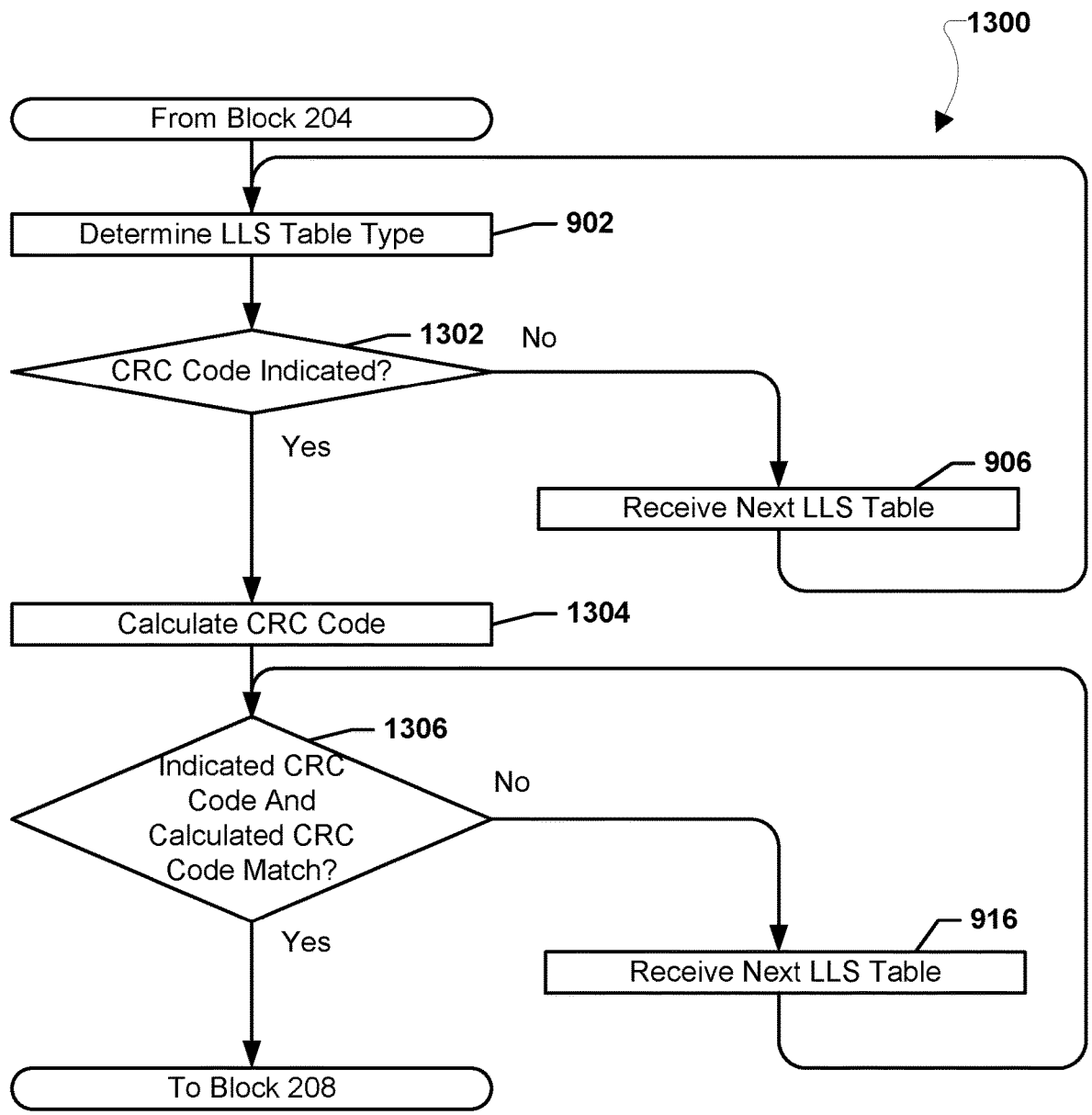
FIG. 13 is a process flow diagram illustrating another embodiment method for determining completeness of low level signaling tables.

FIG. 13 illustrates an embodiment method 1300 for determining completeness of low level signaling tables according to some embodiments. The operations of method 1300 may be performed by a processor of a receiver device, such as gateway 102, smart phone 106, television 103, etc. In various embodiments, the operations of method 1300 may be performed as part of method 200 (FIG. 2), for example in addition to, or in place of, the operations in block 206 as described with reference to FIG. 2.

With reference to FIGS. 1-13, in block 902 the processor may perform operations of like numbered block of method 900 as described with reference to FIG. 9.

In determination block 1302, the processor may determine whether a CRC code is indicated in the received table. In some embodiments, the LLS table may include a field dedicated to a CRC code. Identifying that the field is present may indicate that a CRC code is present in the LLS table. In some embodiments, the LLS table may be a CRC table. Identifying that the field type is a CRC table may indicate that a CRC code is present in the LLS table. In response to determining that a CRC code is not indicated (i.e., determination block 1302="No"), in block 906 the processor may perform operations of like numbered block of method 900 as described with reference to FIG. 9.

In response to determining that a CRC code is indicated (i.e., determination block 1302="Yes"), the processor may calculate a CRC code in block 1304. For example, the processor may use fields from all LLS tables in memory to calculate a CRC code. In various embodiments, the CRC code may be calculated using at least byte values corresponding to three fields of each of the one or more LLS tables. As one example, an LLS table identifier field, an LLS group identifier field, and an LLS table version field of each LLS table may be used to calculate the CRC code. In some embodiments, the CRC function used to generate the CRC code may be an 8, 16, 32, or 64-bit function. When only three fields of each of the one or more LLS tables are used a byte value of a further field, such as the byte value of the group count minus one field, may be used with the LLS table identifier field, the LLS group identifier field, and the LLS table version field to calculate the CRC code.

In determination block 1306, the processor may determine whether the indicated CRC code and the calculated CRC code match. For example, the processor may compare the two CRC codes together. A match may indicate that all the LLS tables are present in memory. The CRC codes being different may indicate that one or more LLS tables are missing and need to be received. In some situations, though the LLS table received may be the first LLS table received since the channel was tuned to, the receiver device may have been previously tuned to the channel and may already have stored LLS tables in memory. In such situations, the receiver device may be able to confirm whether the previously stored LLS tables are a complete set merely by receiving the CRC code and comparing to a previously stored value In response to determining there is not a match (i.e., determination block 1306="No"), the processor may receive the next LLS table in block 916. In block 1306 the processor may determine whether the indicated CRC code and the calculated CRC code match. In this manner, as tables are received the set of received tables may be checked until it is complete.

In response to determining there is a match (i.e., determination block 1306="Yes"), the processor may proceed to block 208.

Figure 14:
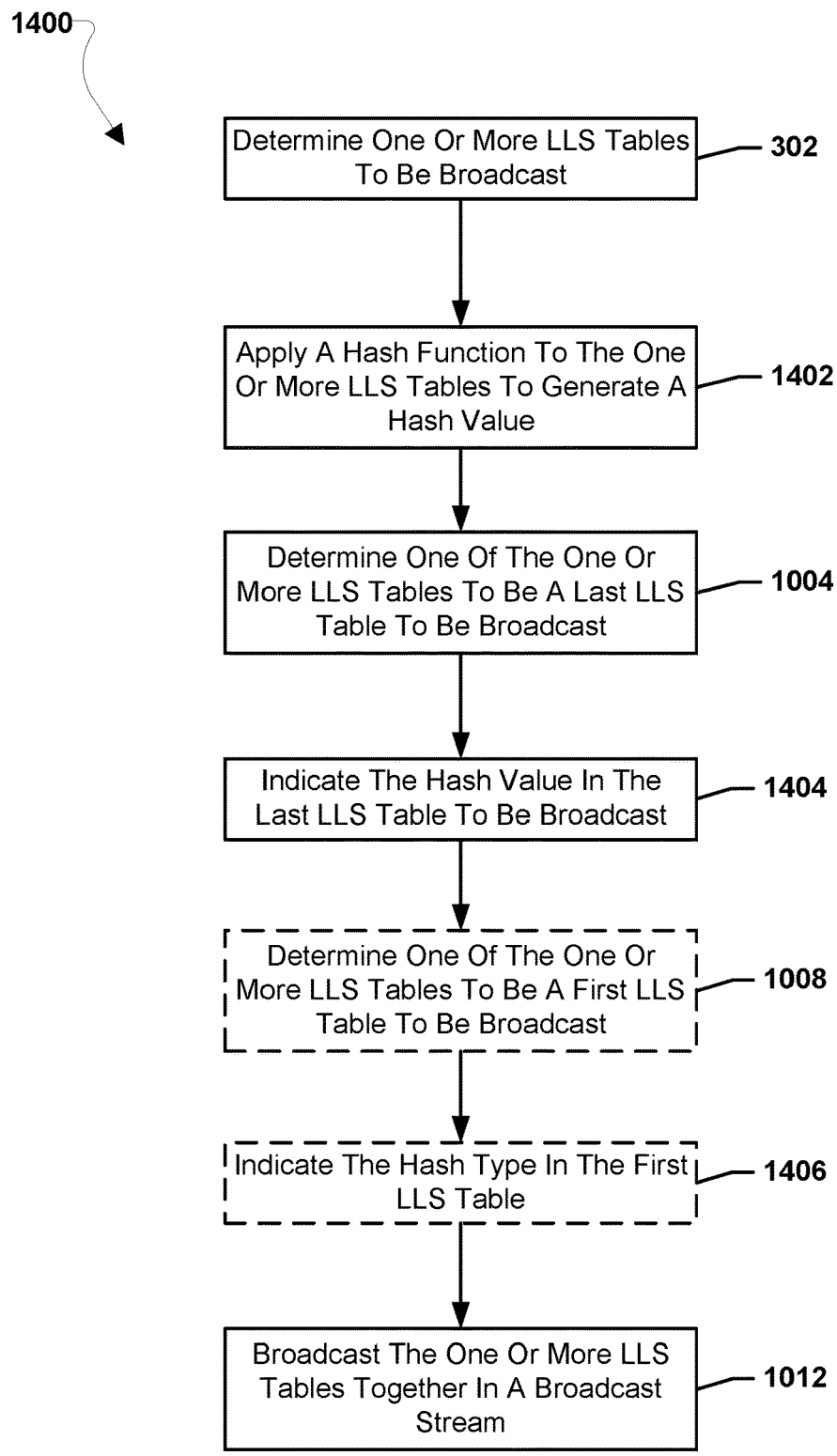
FIG. 14 is a process flow diagram illustrating another embodiment method for broadcast service signaling.

FIG. 14 illustrates an embodiment method 1400 broadcast service signaling according to some embodiments. The operations of the method 1400 may be performed by a processor of a server, such as broadcaster server 110, etc.

With reference to FIGS. 1-14, in block 302 the server may perform operations of like numbered block of the method 300 as described with reference to FIG. 3.

In block 1402, the server may apply a hash function to the one or more LLS tables to generate a hash value. In various embodiments, a hash function may be applied to the one or more LLS tables to be broadcast to generate a hash value. In some embodiments, the hash function may be applied to entire tables. In some embodiments, the hash function may only be applied to a portion of each table, such as the first four fields of the one or more LLS tables.

In block 1004, the server may perform operations of like numbered block of the method 1000 as described with reference to FIG. 10.

In block 1404, the server may indicate the hash value in the last LLS table to be broadcast. For example, the hash value may be indicated in a field or attribute added to the last table to be broadcast. In various embodiments, the presence of a hash table may indicate to a receiver device that the hash table is an ending table of an LLS table set.

In block 1008, the server may perform operations of like numbered block of the method 1000 as described with reference to FIG. 10.

In block 1406, the server may indicate the hash type in the first LLS table. The hash type may indicate the applied hash function used to generate the hash value. For example, the hash type may be indicated in a field or attribute added to a first one or the one or more LLS tables to be broadcast.

In block 1012, the server may perform operations of like numbered block of the method 1000 as described with reference to FIG. 10.

Figure 15:
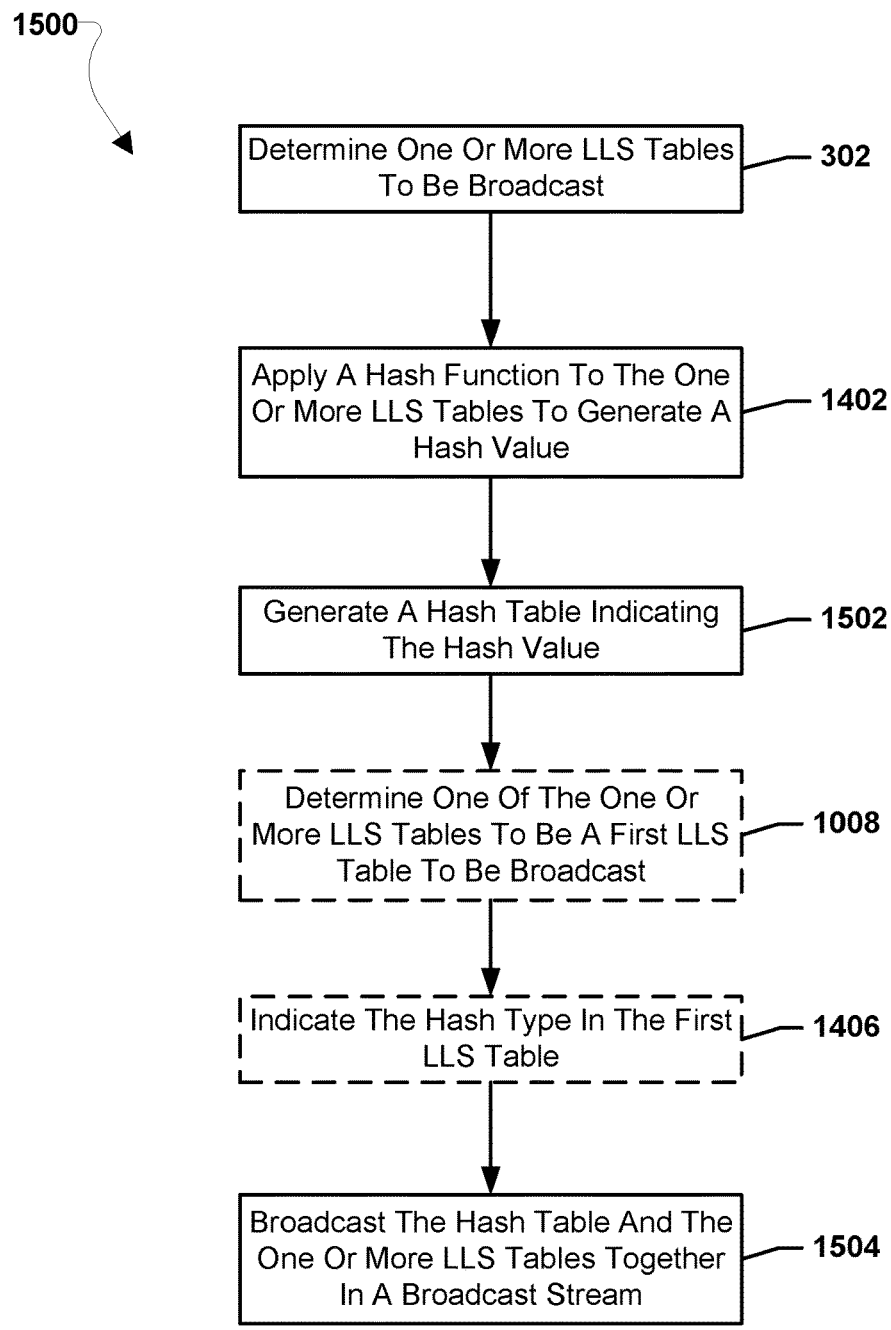
FIG. 15 is a process flow diagram illustrating another embodiment method for broadcast service signaling.

FIG. 15 illustrates an embodiment method 1500 for broadcast service signaling according to some embodiments. The operations of the method 1500 may be performed by a processor of a server, such as broadcaster server 110, etc.

With reference to FIGS. 1-15, in blocks 302 and 1302 the server may perform operations of like numbered blocks of method 300 as described with reference to FIG. 3 and method 1400 as described with reference to FIG. 14.

In block 1502, the server may generate a hash table indicating the hash value. In various embodiments, the hash table may indicate the hash function applied to the one or more LLS tables to generate the hash value. The hash table may itself be a type of LLS table and may include a group ID associated with the determined one or more LLS tables to be broadcast.

In blocks 1008 and 1406, the server may perform operations of like numbered blocks of method 1000 as described with reference to FIG. 10 and method 1400 as described with reference to FIG. 14.

In block 1504, the server may broadcast the hash table and the one or more LLS tables together in a broadcast stream. For example, the server may broadcast the hash table and the one or more LLS tables by controlling the operations of a broadcast transmitter to generate OTA transmissions of broadcast content including the one or more LLS tables and the hash table. In various embodiments, the hash table may be broadcast last in each full repetition time period.

Figure 16:
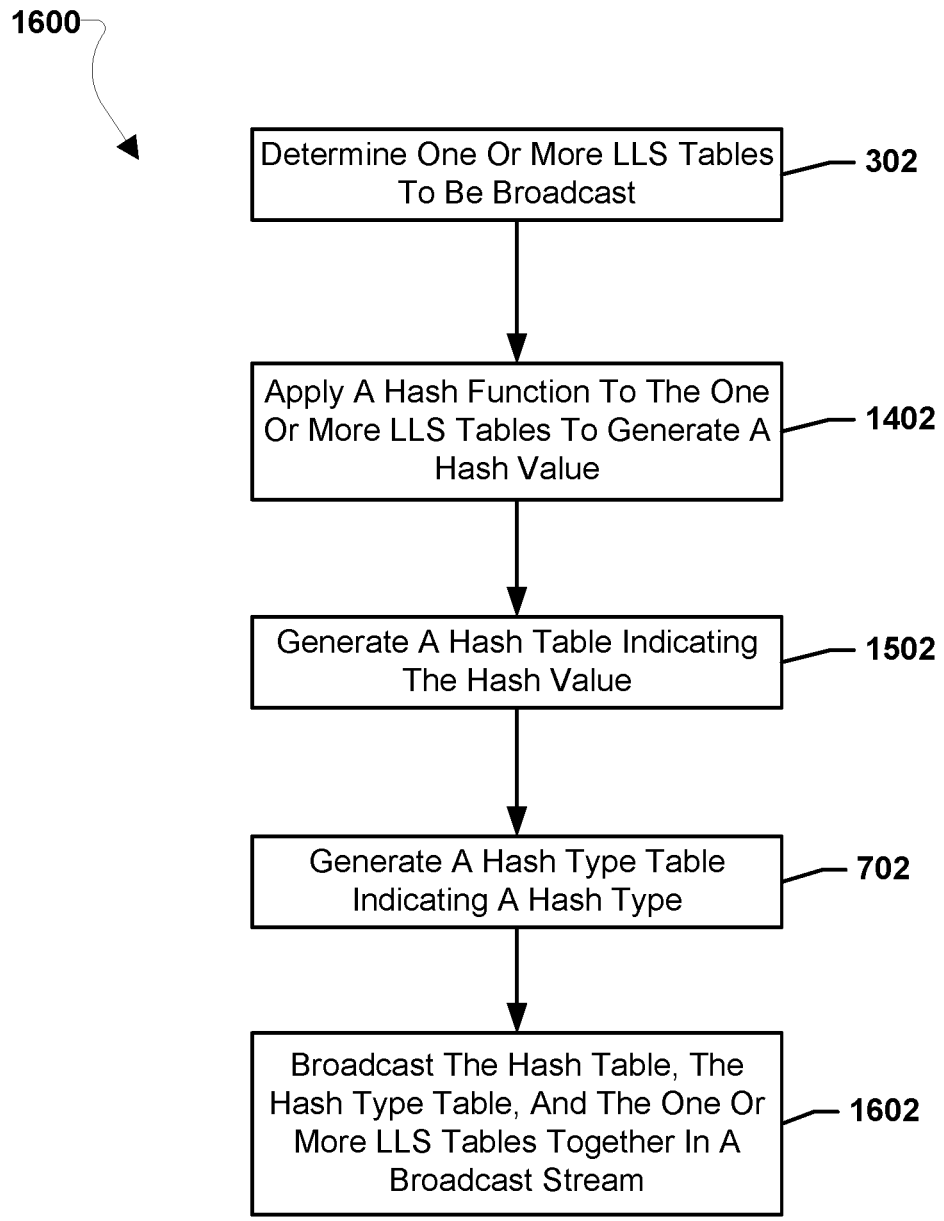
FIG. 16 is a process flow diagram illustrating another embodiment method for broadcast service signaling.

FIG. 16 illustrates an embodiment method 1600 for broadcast service signaling according to some embodiments. The operations of the method 1600 may be performed by a processor of a server, such as broadcaster server 110, etc.

With reference to FIGS. 1-16, in blocks 302, 1402, 1502, and 702 the server may perform operations of like numbered blocks of methods 300 (FIG. 3), 700 (FIG. 7), 1400 (FIG. 14), and 1500 (FIG. 15).

In response to generating a hash type table, the server may broadcast the hash table, the hash type table, and the one or more LLS tables together in a broadcast stream in block 1602. For example, the server may broadcast the hash table, the hash type table, and the one or more LLS tables by controlling the operations of a broadcast transmitter to generate OTA transmissions of broadcast content including the one or more LLS tables, the hash table, and the hash type table. In some embodiments, the hash type table may be broadcast first before the one or more LLS tables may be broadcast and before the hash table in each full repetition time period. In various embodiments, the presence of a hash type table may indicate to a receiver device that the hash type table is the first table of a set of LLS tables.

Figure 17:
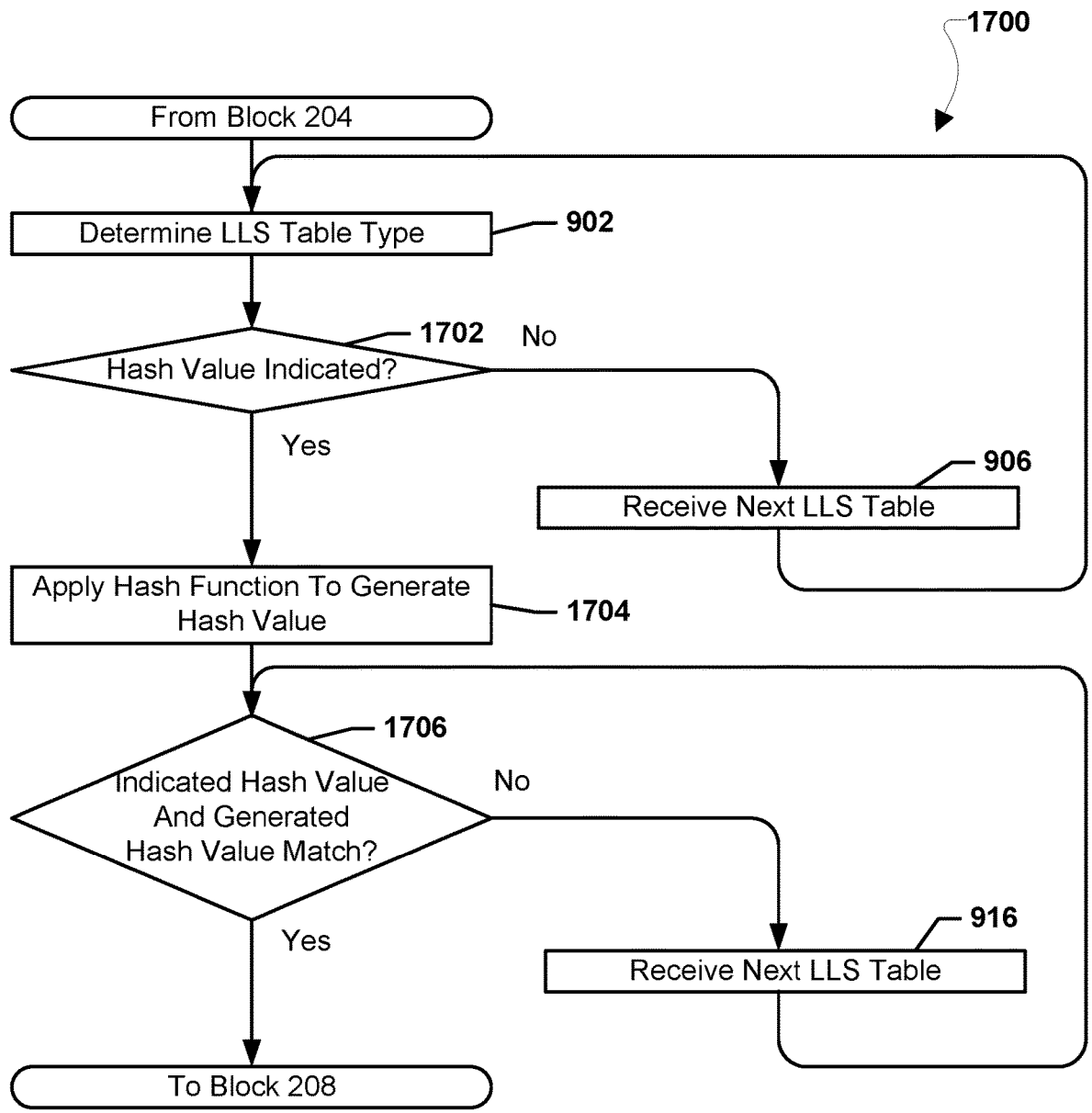
FIG. 17 a process flow diagram illustrating another embodiment method for determining completeness of low level signaling tables.

FIG. 17 illustrates an embodiment method 1700 for determining completeness of low level signaling tables according to some embodiments. The operations of method 1700 may be performed by a processor of a receiver device, such as gateway 102, smart phone 106, television 103, etc. In various embodiments, the operations of method 1700 may be performed as part of method 200 (FIG. 2), for example in addition to, or in place of, the operations of block 206 as described with reference to FIG. 2.

With reference to FIGS. 1-17, in block 902 the processor may perform operations of like numbered block of method 900 as described with reference to FIG. 9.

In determination block 1702, the processor may determine whether a hash value is indicated in the received table. In some embodiments, the LLS table may include a field dedicated to a hash value. Identifying that the field is present may indicate that a hash value is present in the LLS table. In some embodiments, the LLS table may be a hash table. Identifying that the field type is a hash table may indicate that a hash value is present in the LLS table. In response to determining that a hash value is not indicated (i.e., determination block 1702="No"), in block 906 the processor may perform operations of like numbered block of method 900 as described with reference to FIG. 9.

In response to determining that a hash value is indicated (i.e., determination block 1702="Yes"), the processor may apply a hash function to generate a hash value in block 1704. For example, the processor may use fields from all LLS tables in memory to generate a hash value. In various embodiments, a hash function may be applied to the one or more LLS tables to be broadcast to generate a hash value. In some embodiments, the hash function may be applied to entire tables. In some embodiments, the hash function may only be applied to a portion of each table, such as the first four fields of the one or more LLS tables.

In determination block 1706, the processor may determine whether the indicated hash value and the generated hash value match. For example, the processor may compare the two hash values together. A match may indicate that all the LLS tables are present in memory. The hash values being different may indicate that one or more LLS tables are missing and need to be received. In some situations, though the LLS table received may be the first LLS table received since the channel was tuned to, the receiver device may have been previously tuned to the channel and may already have stored LLS tables in memory. In such situations, the receiver device may be able to confirm whether the previously stored LLS tables are a complete set merely by receiving the hash value code and comparing it to previously computed stored value.

In response to determining there is not a match (i.e., determination block 1706="No"), the processor may receive the next LLS table in block 916, and again determine whether the indicated hash value and the calculated hash value match in determination block 1706. In this manner, as tables are received the set of received tables may be checked until it is complete.

In response to determining there is a match (i.e., determination block 1706="Yes"), the processor may proceed to block 208.

Figure 18:
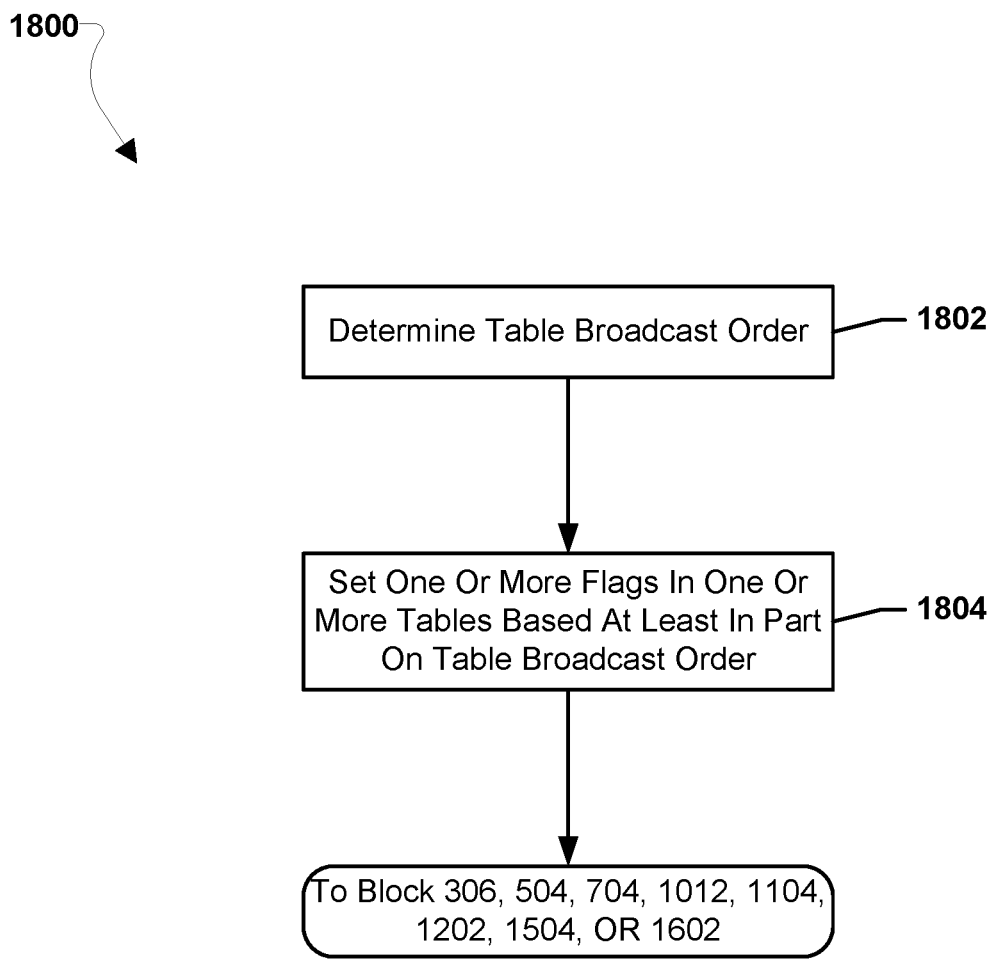
FIG. 18 is a process flow diagram illustrating an embodiment method for broadcast order flagging.

FIG. 18 illustrates an embodiment method 1800 for broadcast order flagging according to some embodiments. The operations of the method 1800 may be performed by a processor of a server, such as broadcaster server 110, etc. In various embodiments, the operations of method 1800 may be performed in conjunction with the operations of methods 300 (FIG. 3), 400 (FIG. 4), 500 (FIG. 5), 600 (FIG. 6), 700 (FIG. 7), 800, (FIG. 8), 1000 (FIG. 10), 1100 (FIG. 11), 1200 (FIG. 12), 1400 (FIG. 14), 1500 (FIG. 15), and/or 1600 (FIG. 16).

With reference to FIGS. 1-18, in block 1802 the server may determine a table broadcast order. The broadcast order may be the order in which LLS tables will be broadcast on each PLP. In block 1804, the server may set one or more flags in one or more tables based at least in part on the table broadcast order. As examples, the server may set flags indicating the first table to be broadcast, the last table to be broadcast, etc. Flags may be set by indicating different byte values in fields of the tables. The tables may then be broadcast in the table broadcast order in blocks 306, 504, 704, 1012, 1104, 1202, 1504, and 1602 of methods 300 (FIG. 3), 400 (FIG. 4), 500 (FIG. 5), 600 (FIG. 6), 700 (FIG. 7), 800, (FIG. 8), 1000 (FIG. 10), 1100 (FIG. 11), 1200 (FIG. 12), 1400 (FIG. 14), 1500 (FIG. 15), and/or 1600 (FIG. 16) as described herein.

Various examples of different standards and protocols are discussed herein, such as ATSC 1.0, ATSC 3.0, DVB, 3GPP, etc. The discussions of specifically ATSC 1.0, ATSC 3.0, DVB, and 3GPP are provided merely as examples to better illustrate the aspects of the various embodiments and are not intended to limit the various embodiments in any way. Other standards and protocols may be used with the various embodiments, and the other standards and protocols may be substituted in the various examples without departing from the spirit or scope of the invention.

Figure 19:
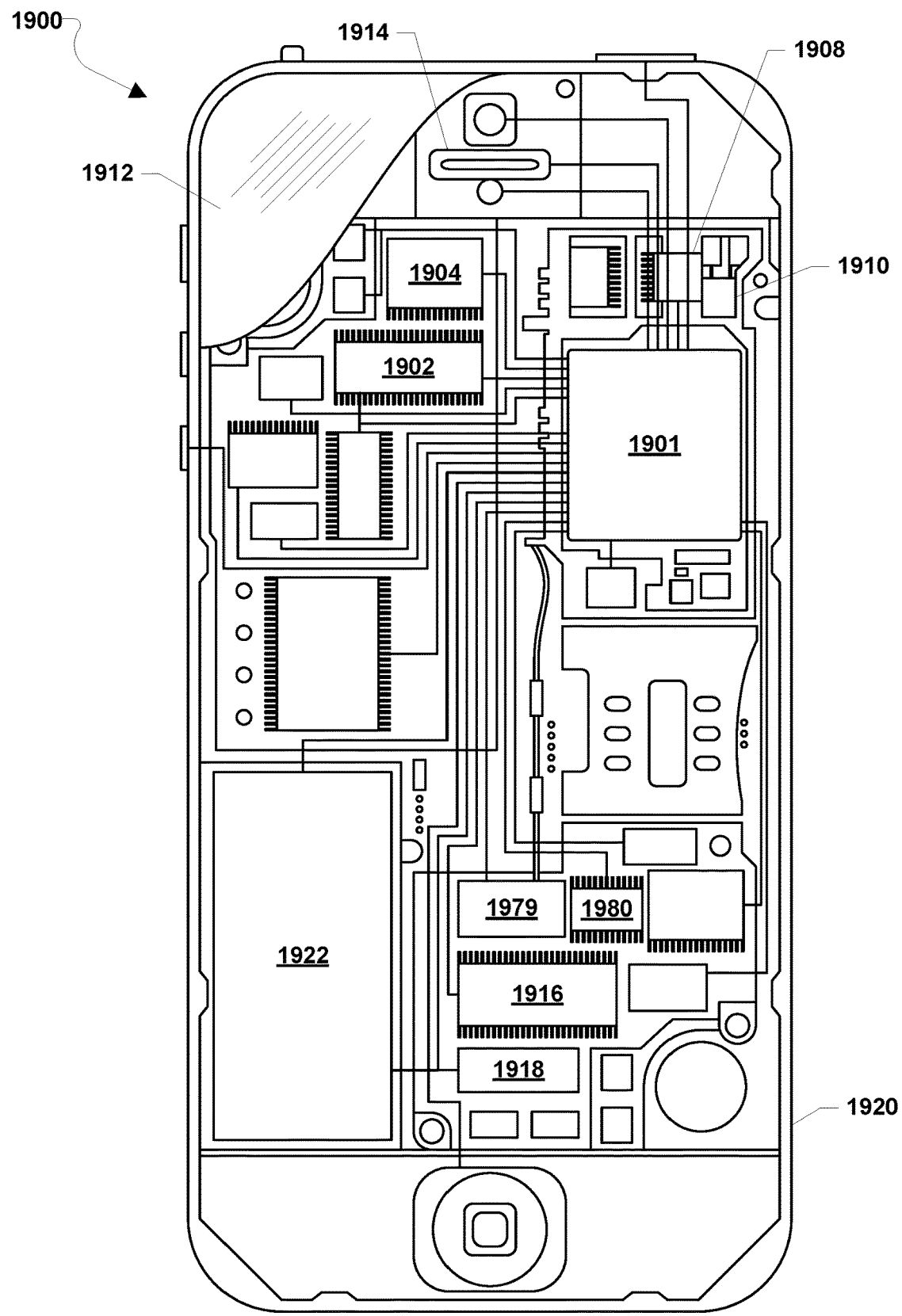
FIG. 19 is a component diagram of an example computing device suitable for use with the various embodiments.

The various embodiments (including, but not limited to, embodiments discussed above with reference to FIGS. 1-18) may be implemented in any of a variety of computing devices (e.g., receiver devices), an example of which is illustrated in FIG. 19. For example, the computing device 1900 may include a processor 1901 coupled to a touch screen controller 1904 and an internal memory 1902. The processor 1901 may be one or more multicore integrated circuits (ICs) designated for general or specific processing tasks. The internal memory 1902 may be volatile or nonvolatile memory and may also be secure and/or encrypted memory, or unsecure and/or unencrypted memory, or any combination thereof. The touch screen controller 1904 and the processor 1901 may also be coupled to a touch screen panel 1912, such as a resistive-sensing touch screen, capacitive-sensing touch screen, infrared sensing touch screen, etc.

The computing device 1900 may have one or more radio signal transceivers 1908 (e.g., Peanut®, Bluetooth®, Zigbee®, Wi-Fi, cellular, etc.) and antennae 1910, for sending and receiving, coupled to each other and/or to the processor 1901. The transceivers 1908 and antennae 1910 may be used with the above-mentioned circuitry to implement the various wireless transmission protocol stacks and interfaces. The computing device 1900 may include a cellular network wireless modem chip 1916 that enables communication via a cellular network and is coupled to the processor 1901. The computing device 1900 may also include one or more antenna 1979 and tuner 1980 coupled to the processor 1901 and configured to receive OTA broadcasts.

The computing device 1900 may include a peripheral device connection interface 1918 coupled to the processor 1901. The peripheral device connection interface 1918 may be singularly configured to accept one type of connection, or multiply configured to accept various types of physical and communication connections, common or proprietary, such as USB, FireWire, Thunderbolt, or PCIe. The peripheral device connection interface 1918 may also be coupled to a similarly configured peripheral device connection port (not shown).

The computing device 1900 may also include speakers 1914 for providing audio outputs. The computing device 1900 may also include a housing 1920, constructed of a plastic, metal, or a combination of materials, for containing all or some of the components discussed herein. The computing device 1900 may include a power source 1922 coupled to the processor 1901, such as a disposable or rechargeable battery. The rechargeable battery may also be coupled to the peripheral device connection port to receive a charging current from a source external to the computing device 1900.

Figure 20:
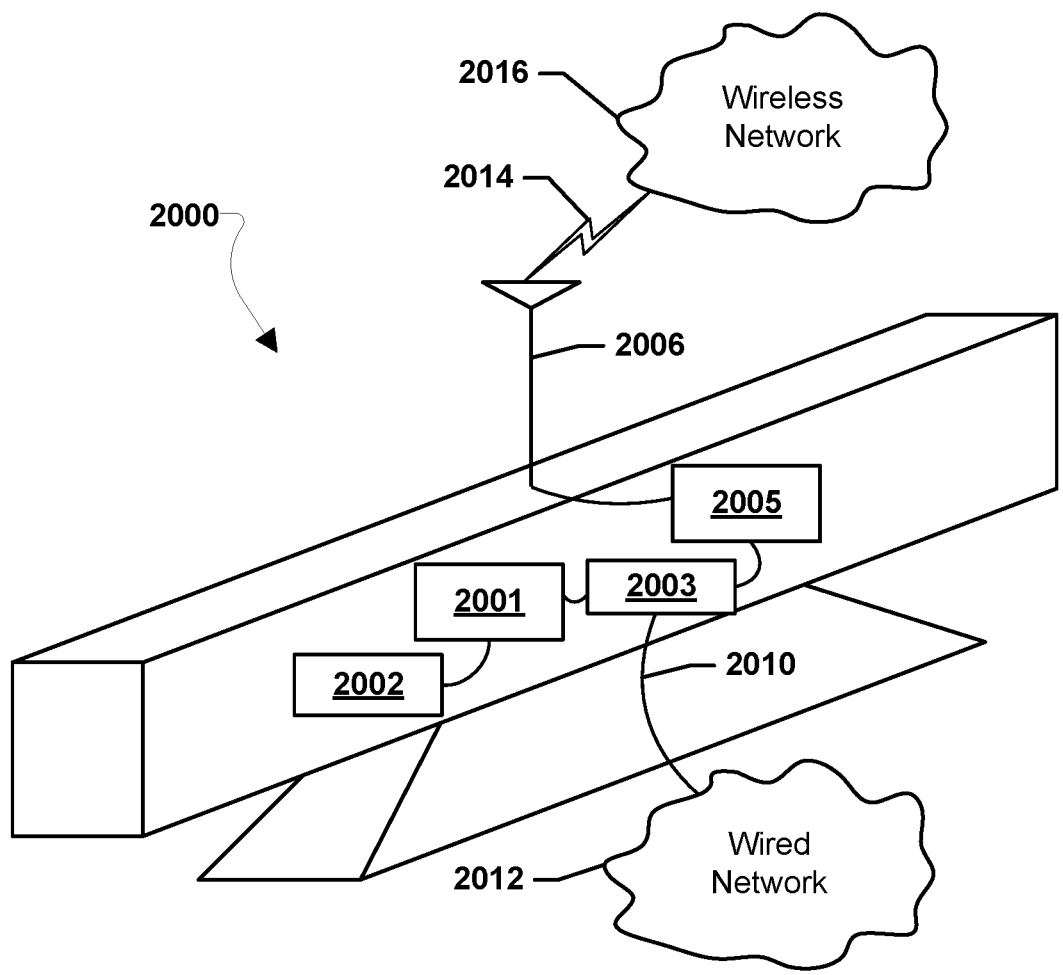
FIG. 20 is a component diagram of an example gateway suitable for use with the various embodiments.

The various embodiments (including, but not limited to, embodiments discussed above with reference to FIGS. 1-18) may also be implemented on any of a variety of commercially available gateways, such as the gateway 2000 illustrated in FIG. 20. Such a gateway 2000 typically includes a processor 2001 coupled to volatile memory 2002. The gateway 2000 may also include one or more antenna 2006 and tuner 2005 coupled to one or more network transceivers 2003 coupled to the processor 2001. The tuner 2005, one or more network transceivers 2003 and processor 2001 may be configured to receive OTA broadcasts. The one or more network transceivers 2003, such as a network access port, coupled to the processor 2001 may be configured to establish a wired connection 2010 with a wired communication network 2012 and/or a wireless connection 2014 with a wireless network 2016. The wired network and/or the wireless network 2016 may be a local area network coupled to other computing devices and routers/switches, the Internet, the public switched telephone network, and/or a cellular network (e.g., CDMA, TDMA, GSM, PCS, 3G, 4G, LTE, or any other type of cellular network).

Figure 21:
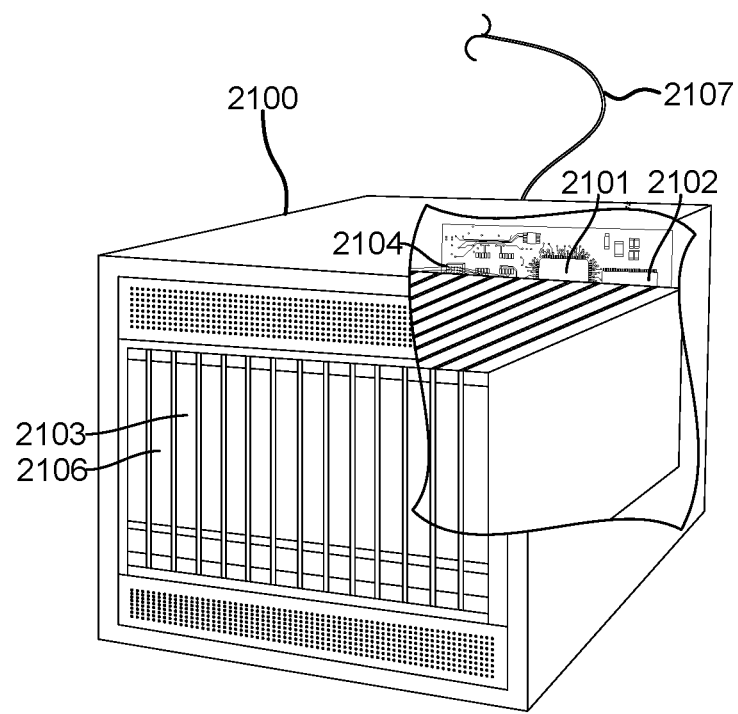
FIG. 21 is a component diagram of an example server suitable for use with various embodiments.

The various embodiments (including, but not limited to, embodiments discussed above with reference to FIGS. 1-18) may also be implemented on any of a variety of commercially available server devices, such as the server 2100 illustrated in FIG. 21. Such a server 2100 typically includes a processor 2101 coupled to volatile memory 2102 and a large capacity nonvolatile memory, such as a disk drive 2103. The server 2100 may also include a floppy disc drive, compact disc (CD) or digital versatile disc (DVD) disc drive 2106 coupled to the processor 2101. The server 2100 may also include one or more wired or wireless network transceivers 2104, such one or more network access ports and/or wired or wireless modems (e.g., one wireless modem, two wireless modems, three wireless modems, four wireless modems, or more than four wireless modems), coupled to the processor 2101 for establishing network interface connections with one or more communication networks 2107, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

Figure 22:
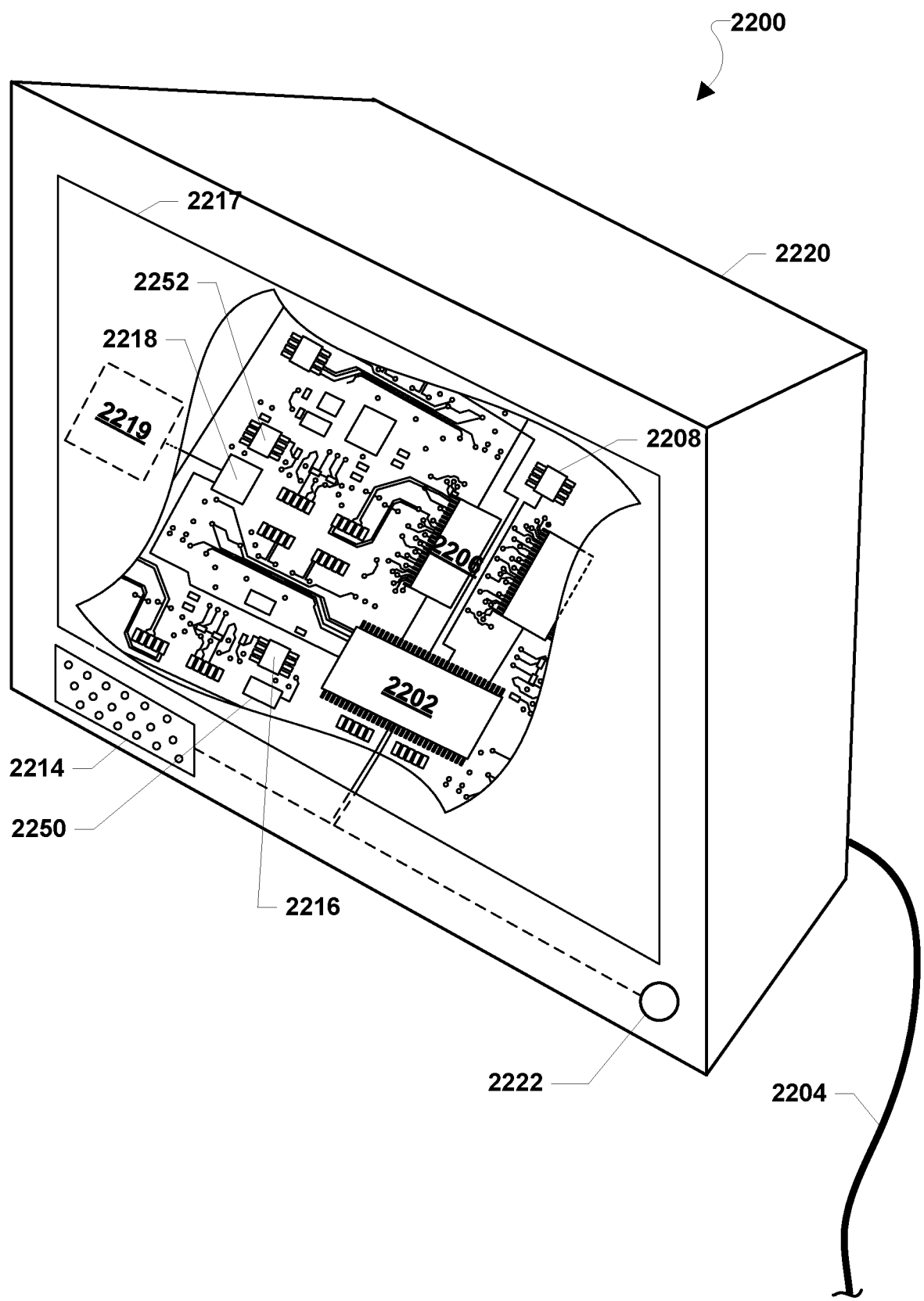
FIG. 22 is a component diagram of another example computing device suitable for use with various embodiments.

The various embodiments (including, but not limited to, embodiments discussed above with reference to FIGS. 1-18), may be implemented in any of a variety of receiver devices (e.g., a television, such as a smart television), an example of which is illustrated in FIG. 22. The television 2200 may include a processor 2202 and an internal memory 2206. The processor 2202 may be one or more multi-core integrated circuits designated for general or specific processing tasks. The internal memory 2206 may be volatile or non-volatile memory and may also be secure and/or encrypted memory, or unsecure and/or unencrypted memory, or any combination thereof. In another embodiment (not shown), the television 2200 may also be coupled to an external memory, such as an external hard drive.

The television 2200 may have one or more satellite, cable, or terrestrial tuners 2208 coupled to the processor 2202. The one or more tuners 2208 may be used with the above-mentioned circuitry to receive and tune signals (e.g., television signals) received from a transmitter system (not shown) over a physical connection 2204 (e.g., a connection to a cable network, a connection to an antenna, etc.). The tuner 2208 and a connected antenna (internal to the television 2200 or connected via physical connection 2204 may be configured to receive OTA broadcasts.

The television 2200 may have one or more radio signal transceivers 2216 (e.g., Peanut®, Bluetooth®, Zigbee®, Wi-Fi, RF, cellular, etc.) and antennae 2250, for sending and receiving, coupled to each other and/or to the processor 2202. The transceivers 2216 and antennae 2250 may be used with the above-mentioned circuitry to implement the various wireless transmission protocol stacks and interfaces. The television 2200 may include one or more cellular network wireless modem chips 2252, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 2202. The one or more cellular network wireless modem chips 2252 may enable the television 2200 to receive broadcast services from one or more cellular networks (e.g., CDMA, TDMA, GSM, PCS, 3G, 4G, LTE, or any other type of cellular network).

The television 2200 may include a peripheral device connection interface 2218 coupled to the processor 2202. The peripheral device connection interface 2218 may be singularly configured to accept one type of connection or may be configured to accept various types of physical and communication interfaces/connections, common or proprietary, such as USB, FireWire, Thunderbolt, or PCIe. The peripheral device connection interface 2218 may also be coupled to a similarly configured peripheral device connection port (not shown), such as a connection port included on a conditional access module 2219 in communication with the television 2200.

The television 2200 may also include speakers 2214 for providing audio outputs. The television 2200 may also include a housing 2220, constructed of a plastic, metal, or a combination of materials, for containing all or some of the components discussed herein. The television 2200 may be connected to a power source (not shown), such as a wall outlet. The television 2200 may also include a physical button 2222 for receiving user inputs. The television 2200 may also include a display screen 2217 coupled to the processor 2202 and used for displaying visual images, such as television programs, etc.

The processors 1901, 2001, 2101, 2202 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1901, 2001, 2101, 2202. The processors 1901, 2001, 2101, 2202 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1901, 2001, 2101, 2202 including internal memory or removable memory plugged into the device and memory within the processors 1901, 2001, 2101, 2202 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for determining available broadcast services, comprising:
  receiving, in a processor of a receiver device, a low level signaling (LLS) table via a broadcast transmission;
  determining, by the processor, whether the received LLS table is a directory table identifying each of a complete set of LLS tables and including an LLS table count field, an LLS table identifier field, and an LLS table version, wherein the LLS table count field identifies a number of LLS tables;
  parsing, by the processor, the directory table in response to determining the LLS table is a directory table;
  determining, by the processor, whether the directory table is confirmed based at least in part on a digital signature in the directory table;
  determining, by the processor, whether a complete set of LLS tables is received based at least in part on the identification of each of the complete set of LLS tables in the directory table in response to determining that the directory table is confirmed; and
  determining, by the processor, available services based at least in part on the complete set of LLS tables before an expiration a repetition time period after receiving the directory table in response to determining that the complete set of LLS tables is received.

2. The method of claim 1, wherein determining whether the directory table is confirmed based at least in part on a digital signature in the directory table comprises:
  determining, by the processor, whether the digital signature matches a certificate associated with LLS tables; and
  determining, by the processor, that the directory table is confirmed in response to determining that the certificate associated with the LLS table matches the digital signature indicated in the directory table.

3. The method of claim 2, wherein the digital signature is a cryptographic message syntax (CMS) signed data element.

4. The method of claim 1, wherein the directory table identifies each of the complete set of LLS tables by type and group.

5. The method of claim 1, wherein:
  the complete set of LLS tables and the directory table correspond to a same physical layer pipe; or
  the complete set of LLS tables correspond to all LLS tables for a broadcast stream and the directory table is generated for the broadcast stream.

6. The method of claim 1, wherein the complete set of LLS tables are a table set for a random-access point (RAP).

7. The method of claim 1, further comprising:
  acquiring, by the processor, one or more selected service of the determined available services.

8. A receiver device, comprising:
  a processor, the processor configured with processor-executable instructions to perform operations to:
    receive a low level signaling (LLS) table via a broadcast transmission;
    determine whether the received LLS table is a directory table identifying each of a complete set of LLS tables and including an LLS table count field, an LLS table identifier field, and an LLS table version, wherein the LLS table count field identifies a number of LLS tables;
    determine the directory table in response to determining the LLS table is a directory table;
    determine whether the directory table is confirmed based at least in part on a digital signature in the directory table;
    determine whether a complete set of LLS tables is received based at least in part on the identification of each of the complete set of LLS tables in the directory table in response to determining that the directory table is confirmed; and
    determine available services based at least in part on the complete set of LLS tables before an expiration a repetition time period after receiving the directory table in response to determining that the complete set of LLS tables is received.

9. The receiver device of claim 8, wherein the processor is further configured to determine whether the directory table is confirmed based at least in part on a digital signature in the directory table by:
  determining whether the digital signature matches a certificate associated with LLS tables; and
  determining that the directory table is confirmed in response to determining that the certificate associated with the LLS table matches the digital signature indicated in the directory table.

10. The receiver device of claim 9, wherein the digital signature is a cryptographic message syntax (CMS) signed data element.

11. The receiver device of claim 8, wherein the directory table identifies each of the complete set of LLS tables by type and group.

12. The receiver device of claim 8, wherein:
the complete set of LLS tables and the directory table correspond to a same physical layer pipe; or
the complete set of LLS tables correspond to all LLS tables for a broadcast stream and the directory table is generated for the broadcast stream.

13. The receiver device of claim 8, wherein the complete set of LLS tables are a table set for a random-access point (RAP).

14. The receiver device of claim 8, wherein the processor is further configured to:
acquire one or more selected service of the determined available services.

15. A receiver device, comprising:
means for receiving a low level signaling (LLS) table via a broadcast transmission;
means for determining whether the received LLS table is a directory table identifying each of a complete set of LLS tables and including an LLS table count field, an LLS table identifier field, and an LLS table version, wherein the LLS table count field identifies a number of LLS tables;
means for parsing the directory table in response to determining the LLS table is a directory table;
means for determining whether the directory table is confirmed based at least in part on a digital signature in the directory table;
means for determining whether a complete set of LLS tables is received based at least in part on the identification of each of the complete set of LLS tables in the directory table in response to determining that the directory table is confirmed; and
means for determining available services based at least in part on the complete set of LLS tables before an expiration a repetition time period after receiving the directory table in response to determining that the complete set of LLS tables is received.

16. The receiver device of claim 15, wherein means for determining whether the directory table is confirmed based at least in part on a digital signature in the directory table comprises:
means for determining whether the digital signature matches a certificate associated with LLS tables; and
means for determining that the directory table is confirmed in response to determining that the certificate associated with the LLS table matches the digital signature indicated in the directory table.

17. The receiver device of claim 16, wherein the digital signature is a cryptographic message syntax (CMS) signed data element.

18. The receiver device of claim 15, wherein the directory table identifies each of the complete set of LLS tables by type and group.

19. The receiver device of claim 15, wherein:
the complete set of LLS tables and the directory table correspond to a same physical layer pipe; or
the complete set of LLS tables correspond to all LLS tables for a broadcast stream and the directory table is generated for the broadcast stream.

20. The receiver device of claim 15, wherein the complete set of LLS tables are a table set for a random-access point (RAP).

21. The receiver device of claim 15, further comprising:
means for acquiring one or more selected service of the determined available services.

22. A non-transitory processor readable medium having stored thereon processor-executable instructions configured to cause a processor of a receiver device to perform operations comprising:
receiving a low level signaling (LLS) table via a broadcast transmission;
determining whether the received LLS table is a directory table identifying each of a complete set of LLS tables and including an LLS table count field, an LLS table identifier field, and an LLS table version, wherein the LLS table count field identifies a number of LLS tables;
determining the directory table in response to determining the LLS table is a directory table;
determining whether the directory table is confirmed based at least in part on a digital signature in the directory table;
determining whether a complete set of LLS tables is received based at least in part on the identification of each of the complete set of LLS tables in the directory table in response to determining that the directory table is confirmed; and
determining available services based at least in part on the complete set of LLS tables before an expiration a repetition time period after receiving the directory table in response to determining that the complete set of LLS tables is received.

* * * * *